US00RE50713E

(19) United States
(12) Reissued Patent
Perez et al.

(10) Patent Number: US RE50,713 E
(45) Date of Reissued Patent: Dec. 30, 2025

(54) DISPOSABLE TANK ELECTRONIC CIGARETTE, METHOD OF MANUFACTURE AND METHOD OF USE

(71) Applicant: Cue Vapor Limited, Walton on Thames (GB)

(72) Inventors: Ruben Hector Perez, Sherman Oaks, CA (US); Alexander Basile, Sherman Oaks, CA (US); Alan Crawford, Sherman Oaks, CA (US)

(73) Assignee: Cue Vapor Limited, Walton on Thames (GB)

(21) Appl. No.: 18/108,212

(22) Filed: Feb. 10, 2023

Related U.S. Patent Documents

Reissue of:
(64) Patent No.: 10,299,513
Issued: May 28, 2019
Appl. No.: 15/516,005
PCT Filed: Oct. 2, 2015
PCT No.: PCT/US2015/053836
§ 371 (c)(1),
(2) Date: Mar. 30, 2017
PCT Pub. No.: WO2016/054580
PCT Pub. Date: Apr. 7, 2016

U.S. Applications:
(63) Continuation of application No. 17/868,699, filed on Jul. 19, 2022, now abandoned, which is a
(Continued)

(51) Int. Cl.
*A24F 13/00* (2006.01)
*A24F 47/00* (2020.01)
(Continued)

(52) U.S. Cl.
CPC ..... *B41J 2/17596* (2013.01); *B41J 2/175* (2013.01); *B41J 2/17509* (2013.01);
(Continued)

(58) Field of Classification Search
CPC ..... A24F 40/42; A24F 40/40; A24F 40/70; A24F 40/10; B65D 25/04; B65D 85/54; H05B 1/0244; H05B 2203/021
See application file for complete search history.

(56) References Cited

U.S. PATENT DOCUMENTS 1,823,554 A 9/1931 Mewborne
1,839,505 A 1/1932 Schulz
(Continued)

FOREIGN PATENT DOCUMENTS

CA 2884987 8/2017
CN 2719043 Y 8/2005
(Continued)

OTHER PUBLICATIONS

Bold Tobacco Vape Pods, By Cue, No publicattion date listed. Found Online (Dec. 8, 2023); (https://www.cue-vapor.com/ products/ bold-tobacco-vape-pods) (Year: 2023).
(Continued)

*Primary Examiner* — Elizabeth L McKane
(74) *Attorney, Agent, or Firm* — McDermott Will & Emery LLP

(57) ABSTRACT

An electronic cigarette device having a disposable tank are described. The disposable tank may have a sealed liquid chamber, an atomizer element and a tank well. An electronic cigarette device, comprising: a housing having a power source; a disposable tank capable of holding an electronic cigarette liquid; the housing having a tank receptacle into which the disposable tank is removable attachable; and a connection mechanism that is part of the disposable tank and the tank receptacle that securely connects the disposable tank to the tank receptacle and provides power from the housing to the disposable tank.

32 Claims, 19 Drawing Sheets

Related U.S. Application Data continuation of application No. 17/555,231, filed on Dec. 17, 2021, now abandoned, which is a continuation of application No. 17/332,074, filed on May 27, 2021, now abandoned, which is an application for the reissue of Pat. No. 10,299,513.

(60) Provisional application No. 62/059,095, filed on Oct. 2, 2014.

(51) Int. Cl.

| | |
|---|---|
| ***B41J 2/175*** | (2006.01) |
| ***B41J 29/02*** | (2006.01) |
| ***B41J 29/13*** | (2006.01) |
| ***B41J 29/38*** | (2006.01) |

(52) U.S. Cl.

CPC ..... *B41J 2/1752* (2013.01); *B41J 29/02* (2013.01); *B41J 29/13* (2013.01); *B41J 29/38* (2013.01)

(56) References Cited

U.S. PATENT DOCUMENTS

| | | | |
|---|---|---|---|
| 2,057,353 | A | 10/1936 | Whittemore |
| 2,250,943 | A | 7/1941 | Arnold |
| 2,561,286 | A | 7/1951 | Montgomery |
| 2,670,137 | A | 2/1954 | Jordan et al. |
| 3,200,819 | A | 8/1965 | Gilbert |
| 3,304,944 | A | 2/1967 | Badertscher |
| 3,585,774 | A | 6/1971 | Rowell et al. |
| 3,589,371 | A | 6/1971 | LaPorte |
| 3,590,825 | A | 7/1971 | Davis |
| 3,608,716 | A | 9/1971 | Rowell et al. |
| 3,625,227 | A | 12/1971 | Fether |
| 3,703,902 | A | 11/1972 | Sargrove |
| 3,707,975 | A | 1/1973 | Davis |
| 3,760,814 | A | 9/1973 | Fether et al. |
| 3,769,990 | A | 11/1973 | Williams |
| 3,861,400 | A | 1/1975 | Perkins et al. |
| 3,888,160 | A | 6/1975 | Westcott et al. |
| 4,153,063 | A | 5/1979 | Roselius et al. |
| 4,657,032 | A | 4/1987 | Dorr et al. |
| 4,666,763 | A | 5/1987 | King et al. |
| 4,676,259 | A | 6/1987 | Ellis et al. |
| 4,735,217 | A | 4/1988 | Gerth et al. |
| 4,736,755 | A | 4/1988 | Oldham et al. |
| 4,771,295 | A | 9/1988 | Baker et al. |
| 4,777,131 | A | 10/1988 | Long et al. |
| 4,777,967 | A | 10/1988 | Bale et al. |
| 4,783,418 | A | 11/1988 | Long et al. |
| 4,832,056 | A | 5/1989 | Bryant et al. |
| 4,832,057 | A | 5/1989 | Bale et al. |
| 4,848,374 | A | 7/1989 | Chard et al. |
| 4,881,555 | A | 11/1989 | Bolt et al. |
| 4,917,120 | A | 4/1990 | Hill |
| 4,945,929 | A | 8/1990 | Egilmex |
| 4,947,874 | A | 8/1990 | Brooks et al. |
| 4,969,476 | A | 11/1990 | Bale et al. |
| 5,025,913 | A | 6/1991 | Colley |
| 5,046,514 | A | 9/1991 | Bolt |
| 5,105,835 | A | 4/1992 | Drewett et al. |
| 5,144,962 | A | 9/1992 | Counts et al. |
| 5,167,242 | A | 12/1992 | Turner et al. |
| 5,271,940 | A | 12/1993 | Cleary et al. |
| 5,293,883 | A | 3/1994 | Edwards |
| D347,490 | S | 5/1994 | Gee |
| 5,388,594 | A | 2/1995 | Counts et al. |
| 5,403,595 | A | 4/1995 | Kitchell et al. |
| D368,552 | S | 4/1996 | Adams |
| 5,505,214 | A | 4/1996 | Collins et al. |
| D370,300 | S | 5/1996 | Gottvald |
| 5,533,995 | A | 7/1996 | Corish et al. |
| D373,443 | S | 9/1996 | Gottvald |
| D373,847 | S | 9/1996 | Gottvald |
| 5,649,554 | A | 7/1997 | Spinkel et al. |
| 5,666,977 | A | 9/1997 | Higgins et al. |
| D386,637 | S | 11/1997 | St-Pierre et al. |
| D393,171 | S | 4/1998 | St-Pierre et al. |
| D393,924 | S | 4/1998 | Wright |
| 5,738,120 | A | 4/1998 | Chard |
| 5,740,817 | A | 4/1998 | Cunningham |
| D394,180 | S | 5/1998 | St-Pierre et al. |
| D394,365 | S | 5/1998 | St-Pierre et al. |
| D394,774 | S | 6/1998 | St-Pierre et al. |
| D395,184 | S | 6/1998 | St-Pierre et al. |
| D398,470 | S | 9/1998 | St-Pierre et al. |
| 5,820,876 | A | 10/1998 | Hoffmann |
| D402,835 | S | 12/1998 | Cyr et al. |
| 5,845,770 | A | 12/1998 | James et al. |
| 5,878,752 | A | 3/1999 | Adams et al. |
| D408,173 | S | 4/1999 | Walrath et al. |
| D418,940 | S | 1/2000 | Luton et al. |
| D421,151 | S | 2/2000 | Luton et al. |
| D422,113 | S | 3/2000 | Higgins |
| 6,082,369 | A | 7/2000 | Nevett et al. |
| 6,125,855 | A | 10/2000 | Nevett et al. |
| 6,155,268 | A | 12/2000 | Takeuchi |
| D438,105 | S | 2/2001 | Conner et al. |
| 6,206,008 | B1 | 3/2001 | Matteau et al. |
| 6,209,835 | B1 | 4/2001 | Walrath et al. |
| 6,216,861 | B1 | 4/2001 | James et al. |
| 6,223,744 | B1 | 5/2001 | Garon |
| 6,340,320 | B1 | 1/2002 | Ogawa |
| 6,394,098 | B1 | 5/2002 | Cunningham |
| 6,474,469 | B1 | 11/2002 | Luton et al. |
| 6,481,441 | B1 | 11/2002 | Cunningham |
| 6,553,999 | B1 | 4/2003 | Cardone et al. |
| 6,684,879 | B1 | 2/2004 | Coffee et al. |
| 6,790,496 | B1 | 9/2004 | Levander et al. |
| 6,803,545 | B2 | 10/2004 | Blake et al. |
| 6,955,842 | B1 | 10/2005 | Koch et al. |
| 7,201,613 | B2 | 4/2007 | Sasaki |
| D545,494 | S | 6/2007 | Soeprapto |
| D547,440 | S | 7/2007 | Louet-Feisser |
| 7,293,565 | B2 | 11/2007 | Griffin et al. |
| D590,988 | S | 4/2009 | Hon |
| D590,989 | S | 4/2009 | Hon |
| D590,990 | S | 4/2009 | Hon |
| D590,991 | S | 4/2009 | Hon |
| 7,658,613 | B1 | 2/2010 | Griffin et al. |
| D614,346 | S | 4/2010 | Lik |
| 7,717,756 | B1 | 5/2010 | Yin et al. |
| 7,726,320 | B2 | 6/2010 | Robinson et al. |
| D624,437 | S | 9/2010 | Leclezio |
| 7,832,410 | B2 | 11/2010 | Hon |
| D649,708 | S | 11/2011 | Oneil |
| 8,156,944 | B2 | 4/2012 | Han |
| 8,205,622 | B2 | 6/2012 | Pan |
| D665,270 | S | 8/2012 | Leclezio |
| D668,140 | S | 10/2012 | Collins |
| D668,141 | S | 10/2012 | Collins |
| D668,533 | S | 10/2012 | Collins |
| D668,534 | S | 10/2012 | Collins |
| D668,535 | S | 10/2012 | Collins |
| 8,314,591 | B2 | 11/2012 | Terry et al. |
| 8,333,197 | B2 | 12/2012 | Cross et al. |
| 8,347,684 | B2 | 1/2013 | Coderre |
| D676,741 | S | 2/2013 | Van Landsveld et al. |
| 8,365,742 | B2 | 2/2013 | Hon |
| 8,375,957 | B2 | 2/2013 | Hon |
| 8,393,331 | B2 | 3/2013 | Hon |
| D681,445 | S | 5/2013 | Van Landsveld et al. |
| 8,464,867 | B2 | 6/2013 | Holloway et al. |
| 8,490,628 | B2 | 7/2013 | Hon |
| 8,499,766 | B1 | 8/2013 | Newton |
| 8,511,318 | B2 | 8/2013 | Hon |
| D690,461 | S | 9/2013 | Chen |
| 8,528,569 | B1 | 9/2013 | Newton |
| 8,550,068 | B2 | 10/2013 | Terry et al. |
| 8,556,071 | B2 | 10/2013 | Holloway et al. |
| D693,670 | S | 11/2013 | Van Landsveld et al. |
| 8,689,804 | B2 | 4/2014 | Fernando |
| 8,689,805 | B2 | 4/2014 | Hon |

(56) References Cited

U.S. PATENT DOCUMENTS 8,794,231 B2 8/2014 Thorens et al.
8,863,752 B2 10/2014 Hon
8,881,738 B2 11/2014 Bryman
8,893,726 B2 11/2014 Hon
8,897,628 B2 11/2014 Conley et al.
8,899,239 B2 12/2014 Hon
8,910,641 B2 12/2014 Hon
D728,855 S 5/2015 Liu
D729,444 S 5/2015 Leidel
D730,572 S 5/2015 LeideL
9,060,548 B2 6/2015 Zheng et al.
9,078,473 B2 7/2015 Worm et al.
D738,569 S 9/2015 Saide
D741,001 S 10/2015 Alarcon et al.
D742,062 S 10/2015 Almsberger
9,155,336 B2 10/2015 Liu
D745,213 S 12/2015 Alima
D748,325 S 1/2016 Leidel
D748,329 S 1/2016 Bagai et al.
D751,756 S 3/2016 Hearn
D753,336 S 4/2016 Chen
D754,919 S 4/2016 Alarcon et al.
9,301,548 B2 4/2016 Liu
9,320,300 B2 4/2016 Hon
D755,057 S 5/2016 Mutter
9,326,546 B2 5/2016 Garcia Urbano et al.
9,326,548 B2 5/2016 Hon
9,326,549 B2 5/2016 Hon
9,326,550 B2 5/2016 Hon
9,326,551 B2 5/2016 Hon
9,332,787 B2 5/2016 Liu
9,339,062 B2 5/2016 Hon
D758,656 S 6/2016 Freshwater
D761,999 S 7/2016 Liu
9,386,805 B2 7/2016 Liu
D764,703 S 8/2016 Liu
9,408,416 B2 8/2016 Monsees et al.
9,420,831 B2 8/2016 Liu
9,427,022 B2 8/2016 Levin et al.
D767,820 S 9/2016 Jordan et al.
D767,822 S 9/2016 Jordan et al.
D768,331 S 10/2016 Chen
D769,520 S 10/2016 Hua
D771,309 S 11/2016 Ward
D771,867 S 11/2016 Leidel
D773,114 S 11/2016 Leidel
D773,116 S 11/2016 Liu
D775,414 S 12/2016 Ampolini
9,510,624 B2 * 12/2016 Li ..... A61M 11/041
9,516,899 B2 12/2016 Plojoux et al.
D775,762 S 1/2017 Chen
D776,051 S 1/2017 Wang
9,532,604 B2 1/2017 Conley et al.
9,549,573 B2 1/2017 Monsees et al.
D780,373 S 2/2017 Bennett
9,609,893 B2 4/2017 Novak et al.
D788,362 S 5/2017 Qiu
D790,766 S 6/2017 Li
D790,767 S 6/2017 Rush
9,675,114 B2 6/2017 Timmermans
D792,020 S 7/2017 Mendoza
D792,642 S 7/2017 Mendoza
D799,743 S 10/2017 Qiu
D799,746 S 10/2017 Leidel
D800,377 S 10/2017 Liu
9,801,415 B2 10/2017 Tu
D802,834 S 11/2017 Mathias
9,814,265 B2 11/2017 Rinker
9,814,268 B2 11/2017 Robinson et al.
9,820,509 B2 11/2017 Newton et al.
D805,685 S 12/2017 Lee
D805,687 S 12/2017 Perez
9,839,238 B2 12/2017 Worm et al.
D807,576 S 1/2018 Liu
D807,579 S 1/2018 Wu
D809,191 S 1/2018 Li
D809,192 S 1/2018 Liu
9,861,138 B2 1/2018 Liu
9,901,120 B2 2/2018 Liu
9,901,123 B2 2/2018 Robinson et al.
D814,693 S 4/2018 Qiu
D815,347 S 4/2018 Jones
9,930,915 B2 4/2018 Worm et al.
D819,880 S 6/2018 Qiu
10,058,129 B2 8/2018 Monsees et al.
10,104,911 B2 10/2018 Thorens et al.
10,130,123 B2 11/2018 Hatton et al.
10,143,242 B2 12/2018 Weigensberg et al.
10,219,548 B2 3/2019 Robinson et al.
10,226,079 B2 3/2019 Robinson et al.
10,299,513 B2 5/2019 Perez
10,299,517 B2 5/2019 Hawes et al.
10,334,881 B1 7/2019 Conley et al.
10,362,809 B2 7/2019 Worm et al.
10,420,374 B2 9/2019 Liu
10,485,269 B2 11/2019 Hawes et al.
10,492,541 B2 12/2019 Lau et al.
10,492,542 B1 12/2019 Worm et al.
D872,932 S 1/2020 Powell et al.
10,555,556 B2 2/2020 Malgat et al.
10,588,357 B2 3/2020 Hawes et al.
D881,461 S 4/2020 Wright
10,709,173 B2 7/2020 Monsees et al.
D914,278 S 3/2021 Luo
D930,236 S 9/2021 Fornarelli
11,134,722 B2 10/2021 Verleur et al.
11,202,470 B2 12/2021 Rabinowitz et al.
11,229,239 B2 1/2022 Galloway et al.
RE49,114 E 6/2022 Newton
D969,399 S 11/2022 Sakamaki
11,497,864 B2 11/2022 Conley et al.
D972,773 S 12/2022 Barody
D981,035 S 3/2023 Barody
11,606,981 B2 3/2023 Verleur et al.
2001/0026788 A1 10/2001 Piskorz
2003/0176467 A1 9/2003 Andersson et al.
2004/0034068 A1 2/2004 Warchol et al.
2004/0055613 A1 3/2004 Horian
2004/0065324 A1 4/2004 Pivinski
2004/0084044 A1 5/2004 Childers et al.
2004/0191301 A1 9/2004 Van Duren
2005/0268911 A1 12/2005 Cross et al.
2006/0130857 A1 6/2006 Roth et al.
2006/0191546 A1 8/2006 Takano et al.
2006/0196518 A1 9/2006 Hon
2006/0233714 A1 10/2006 Assie et al.
2006/0283468 A1 12/2006 Lipowicz
2007/0072442 A1 3/2007 DiFonzo et al.
2007/0267031 A1 11/2007 Hon
2007/0283972 A1 12/2007 Monsees et al.
2008/0092912 A1 4/2008 Robinson et al.
2008/0292634 A1 11/2008 Bakaletz et al.
2008/0308113 A1 12/2008 Nencioni
2008/0314398 A1 12/2008 Fish
2009/0126745 A1 5/2009 Hon
2009/0169606 A1 7/2009 Andersen et al.
2009/0246264 A1 10/2009 Andersen et al.
2009/0255534 A1 10/2009 Paterno
2009/0272379 A1 11/2009 Thorens et al.
2009/0283103 A1 11/2009 Nielsen et al.
2010/0031968 A1 2/2010 Sheikh et al.
2010/0242974 A1 9/2010 Pan
2011/0011396 A1 1/2011 Fang
2011/0036346 A1 2/2011 Cohen et al.
2011/0094523 A1 4/2011 Thorens et al.
2011/0168194 A1 7/2011 Hon
2011/0209717 A1 9/2011 Han
2011/0226236 A1 9/2011 Buchberger
2011/0308521 A1 12/2011 Kofford
2012/0090630 A1 4/2012 Hon
2012/0111347 A1 5/2012 Hon
2012/0199663 A1 8/2012 Qiu
2012/0211015 A1 8/2012 Li et al.
2012/0234315 A1 9/2012 Li et al.

(56) References Cited

U.S. PATENT DOCUMENTS

2012/0261285 A1 10/2012 Holloway et al.
2012/0261286 A1 10/2012 Holloway et al.
2012/0266902 A1 10/2012 Drezen et al.
2012/0273589 A1 11/2012 Hon
2012/0279512 A1 11/2012 Hon
2012/0285476 A1 11/2012 Hon
2012/0318882 A1 12/2012 Abehasera
2013/0037041 A1 2/2013 Worm et al.
2013/0042865 A1 2/2013 Monsees et al.
2013/0081642 A1 4/2013 Safari
2013/0125906 A1 5/2013 Hon
2013/0139833 A1 6/2013 Hon
2013/0167854 A1 7/2013 Shin
2013/0168880 A1 7/2013 Duke
2013/0192617 A1* 8/2013 Thompson ..... A24F 47/008 131/329
2013/0192623 A1 8/2013 Tucker et al.
2013/0206152 A1 8/2013 Garcia Urbano et al.
2013/0213419 A1 8/2013 Tucker et al.
2013/0213420 A1 8/2013 Hon
2013/0220315 A1 8/2013 Conley et al.
2013/0228191 A1 9/2013 Newton
2013/0255702 A1 10/2013 Griffith et al.
2013/0276798 A1 10/2013 Hon
2013/0276804 A1 10/2013 Hon
2013/0284194 A1* 10/2013 Newton ..... A24F 47/008 131/329
2013/0284623 A1 10/2013 Groulx et al.
2013/0319438 A1 12/2013 Liu
2014/0000638 A1 1/2014 Sebastian et al.
2014/0014125 A1 1/2014 Fernando
2014/0060554 A1 3/2014 Collett et al.
2014/0107815 A1 4/2014 Lamothe
2014/0150783 A1 6/2014 Liu
2014/0150810 A1 6/2014 Hon
2014/0174458 A1 6/2014 Katz
2014/0182608 A1 7/2014 Verleur
2014/0190478 A1 7/2014 Liu
2014/0190502 A1 7/2014 Liu
2014/0209110 A1 7/2014 Hon
2014/0261486 A1 9/2014 Potter
2014/0261495 A1 9/2014 Novak et al.
2014/0261499 A1 9/2014 Hon
2014/0283824 A1 9/2014 Wheelock
2014/0305453 A1 10/2014 Hon
2014/0318559 A1 10/2014 Thorens et al.
2014/0318560 A1 10/2014 Hon
2014/0332021 A1 11/2014 Li
2014/0339213 A1 11/2014 Bao
2014/0363314 A1 12/2014 Jiang et al.
2015/0020831 A1 1/2015 Weigensberg et al.
2015/0034103 A1 2/2015 Hon
2015/0040926 A1 2/2015 Saydar
2015/0040927 A1 2/2015 Li
2015/0040929 A1 2/2015 Hon
2015/0047658 A1 2/2015 Cyphert
2015/0128971 A1 5/2015 Verleur
2015/0128974 A1 5/2015 Hon
2015/0136124 A1 5/2015 Aronie
2015/0136155 A1 5/2015 Verleur
2015/0181944 A1 7/2015 Li
2015/0208729 A1 7/2015 Monsees
2015/0216230 A1 8/2015 Loos et al.
2015/0245658 A1 9/2015 Worm et al.
2015/0250229 A1 9/2015 Hon
2015/0250230 A1 9/2015 Hon
2015/0250231 A1 9/2015 Hon
2015/0250232 A1 9/2015 Hon
2015/0272224 A1 10/2015 Hon
2015/0305406 A1 10/2015 Li
2015/0335075 A1 11/2015 Minskoff
2016/0021933 A1 1/2016 Thorens et al.
2016/0057811 A1 2/2016 Alarcon et al.
2016/0073692 A1 3/2016 Alarcon et al.
2016/0120218 A1 5/2016 Schennum
2016/0120222 A1 5/2016 Bagai et al.
2016/0128389 A1 5/2016 Lamb et al.
2016/0135506 A1 5/2016 Sanchez et al.
2016/0165955 A1 6/2016 Horne
2016/0213866 A1 7/2016 Tan ..... A61M 15/0021
2016/0271347 A1 9/2016 Raichman
2016/0353800 A1 12/2016 Di Carlo
2016/0366946 A1 12/2016 Murison et al.
2016/0374397 A1 12/2016 Jordan et al.
2017/0006918 A1 1/2017 Chen
2017/0064999 A1 3/2017 Perez et al.
2017/0318861 A1 11/2017 Thorens
2017/0354180 A1* 12/2017 Fornarelli ..... H05B 3/04
2020/0315250 A1 10/2020 Chen et al.

FOREIGN PATENT DOCUMENTS

CN 100593982 C 3/2010
CN 10183368 9/2010
CN 202697716 U 1/2013
CN 2002819631 U 3/2013
CN 202919037 U 5/2013
CN 203087525 U 7/2013
CN 203152491 8/2013
CN 203327954 12/2013
CN 204377940 6/2015
CN 103355745 8/2016
CN 206453243 9/2017
CN 209234986 8/2019
DE 202010002041 5/2010
EP 0101227 2/1984
EP 0102247 3/1984
EP 0165704 12/1985
EP 0188916 7/1986
EP 0227424 7/1987
EP 0227425 7/1987
EP 0229709 7/1987
EP 0229710 7/1987
EP 0234115 9/1987
EP 0239184 9/1987
EP 0239245 9/1987
EP 0242202 10/1987
EP 0264195 4/1988
EP 0277519 8/1988
EP 0286256 10/1988
EP 0295122 12/1988
EP 0309220 3/1989
EP 0369697 5/1990
EP 0380324 8/1990
EP 0407022 1/1991
EP 0475580 3/1992
EP 0531075 3/1993
EP 0693441 1/1996
EP 0706331 4/1996
EP 0724391 8/1996
EP 0782534 7/1997
EP 0848914 6/1998
EP 0853893 7/1998
EP 0862865 9/1998
EP 0878999 11/1998
EP 0924997 6/1999
EP 0967897 1/2000
EP 1006818 6/2000
EP 1014810 7/2000
EP 1017593 7/2000
EP 1033327 9/2000
EP 1048230 11/2000
EP 1094724 5/2001
EP 1098574 5/2001
EP 1098825 5/2001
EP 1144253 10/2001
EP 1184300 3/2002
EP 0981485 1/2003
EP 1313653 5/2003
EP 2022349 2/2009
EP 1736065 6/2009
EP 2110034 10/2009
EP 2113178 11/2009
EP 2272386 1/2011

(56) References Cited

FOREIGN PATENT DOCUMENTS

| | | | |
|---|---|---|---|
| EP | 2325093 | | 5/2011 |
| EP | 2376334 | | 10/2011 |
| EP | 2376335 | | 10/2011 |
| EP | 2399636 | | 12/2011 |
| EP | 2404515 | | 1/2012 |
| EP | 2415363 | | 2/2012 |
| EP | 2443946 | | 4/2012 |
| EP | 2681130 | | 1/2014 |
| EP | 2821356 | | 1/2015 |
| EP | 2878215 | | 6/2015 |
| EP | 2885986 | | 6/2015 |
| EP | 2489391 | | 9/2015 |
| EP | 1656173 | | 12/2015 |
| EP | 2313140 | | 3/2016 |
| EP | 3009019 | | 4/2016 |
| EP | 3086671 | | 9/2018 |
| EP | 2875740 | | 10/2018 |
| EP | 3469934 | | 4/2019 |
| EP | 3508080 | | 7/2019 |
| EP | 3513673 | | 7/2019 |
| EP | 3456214 | | 11/2020 |
| EP | 3491948 | | 12/2020 |
| EP | 3504991 | | 1/2021 |
| EP | 3791739 | | 3/2021 |
| EP | 3504989 | | 6/2021 |
| EP | 3430921 | | 8/2021 |
| EP | 3498115 | | 9/2021 |
| EP | 3613453 | | 9/2021 |
| EP | 3504990 | | 11/2021 |
| EP | 3928646 | | 12/2021 |
| EP | 3626092 | | 7/2023 |
| GB | 6264834 | | 8/2022 |
| GB | 6264831 | | 4/2023 |
| GB | 6264832 | | 4/2023 |
| GB | 6264833 | | 4/2023 |
| GB | 6264835 | | 4/2023 |
| JP | 2009-070654 | | 4/2009 |
| KR | 200453400 | | 4/2011 |
| KR | 200453424 | Y1 | 5/2011 |
| KR | 20-0454110 | | 6/2011 |
| KR | 200457694 | | 12/2011 |
| KR | 10-2012-0050568 | | 5/2012 |
| KR | 2012-0074625 | | 7/2012 |
| WO | WO-91/18535 | | 12/1991 |
| WO | WO 1995/001108 | | 1/1995 |
| WO | WO 1995/010952 | | 4/1995 |
| WO | WO 1996/009230 | | 3/1996 |
| WO | WO-96/32854 | | 10/1996 |
| WO | WO 1997/014322 | | 4/1997 |
| WO | WO 1997/028706 | | 8/1997 |
| WO | WO-97/38595 | | 10/1997 |
| WO | WO 1998/007338 | | 2/1998 |
| WO | WO 1998/026676 | | 6/1998 |
| WO | WO 1998/026677 | | 6/1998 |
| WO | WO 1998/050288 | | 11/1998 |
| WO | WO 1998/054060 | | 12/1998 |
| WO | WO 1999/065320 | | 12/1999 |
| WO | WO 2000/002464 | | 1/2000 |
| WO | WO 2000/005151 | | 2/2000 |
| WO | WO 2000/007467 | | 2/2000 |
| WO | WO 2000/040465 | | 7/2000 |
| WO | WO 2000/051912 | | 9/2000 |
| WO | WO 2000/065939 | | 11/2000 |
| WO | WO 2001/022839 | | 4/2001 |
| WO | WO 2001/054520 | | 8/2001 |
| WO | WO 2001/087738 | | 11/2001 |
| WO | WO 2001/093705 | | 12/2001 |
| WO | WO 2002/018236 | | 3/2002 |
| WO | WO-2002/019107 | | 3/2002 |
| WO | WO-2004/080216 | | 9/2004 |
| WO | WO 2006/029723 | | 3/2006 |
| WO | WO-2007/078273 | | 7/2007 |
| WO | WO 2008/064463 | | 6/2008 |
| WO | WO 2008/122589 | | 10/2008 |
| WO | WO-2010/145805 | | 12/2010 |
| WO | WO 2011/003525 | | 1/2011 |
| WO | WO 2011/054650 | | 5/2011 |
| WO | WO 2011/060930 | | 5/2011 |
| WO | WO 2011/060931 | | 5/2011 |
| WO | WO 2011/064351 | | 6/2011 |
| WO | WO-2011/065754 | | 6/2011 |
| WO | WO-2011/160788 | | 12/2011 |
| WO | WO 2012/016641 | | 2/2012 |
| WO | WO 2012/119607 | | 9/2012 |
| WO | WO 2012/119611 | | 9/2012 |
| WO | WO-2012/142293 | | 10/2012 |
| WO | WO 2012/160369 | | 11/2012 |
| WO | WO 2013/016846 | | 2/2013 |
| WO | WO-2013/076098 | | 5/2013 |
| WO | WO-2013/083634 | | 6/2013 |
| WO | WO-2013/093695 | | 6/2013 |
| WO | WO-2013/116572 | | 8/2013 |
| WO | WO 2013/155645 | | 10/2013 |
| WO | WO 2013/159245 | | 10/2013 |
| WO | WO-2014/039308 | | 3/2014 |
| WO | WO 2014/194972 | | 12/2014 |
| WO | WO 2014/205456 | | 12/2014 |
| WO | WO 2015/000798 | | 1/2015 |
| WO | WO 2015/014704 | | 2/2015 |
| WO | WO 2015/018479 | | 2/2015 |
| WO | WO 2015/049046 | | 4/2015 |
| WO | WO 2015/090490 | | 6/2015 |
| WO | WO-2015/100361 | | 7/2015 |
| WO | WO 2015/131991 | | 9/2015 |
| WO | WO-2015/153443 | | 10/2015 |
| WO | WO 2015/161459 | | 10/2015 |
| WO | WO 2015/173105 | | 11/2015 |
| WO | WO 2015/197165 | | 12/2015 |
| WO | WO 2016/008150 | | 1/2016 |
| WO | WO 2016/023651 | | 2/2016 |
| WO | WO 2016/029225 | | 2/2016 |
| WO | WO 2016/040575 | | 3/2016 |
| WO | WO 2016/046116 | | 3/2016 |
| WO | WO 2016/054580 | | 4/2016 |
| WO | WO 2016/058992 | | 4/2016 |
| WO | WO 2016/059000 | | 4/2016 |
| WO | WO 2016/059003 | | 4/2016 |

OTHER PUBLICATIONS

Cue Vapor by Digirette. found online [Mar. 2, 2017] https://www.cuevapor.com/cue-vapor-system/.

Cue Vapor System. By "UK ECig Store". No Publication Date Listed. Found Online (Nov. 30, 2023). (https://www.ukecigstore.com/products/cue-vapor-pod-kit?_pos=2&_sid=ab67b8d59&_ss=r) (Year: 2023).

International Search Report and Written Opinion received in PCT Application No. PCT/EP2023/073732 dated Dec. 4, 2023, 16 pgs.

HoneyStick Phantom Squeeze Box2-In-1 Cartridge Vape. By "Dope Boo". No Publication Date Listed. Found Online (Nov. 30, 2023) . (https://www.dopeboo.com/products/honeystick-phantom-squeeze-box-2-in-1 -cartridge-vape) (Year: 2023).

ISR received in PCT Application No. PCT/US2015/053836 dated Dec. 22, 2015.

* cited by examiner

SECTION B-B

DISPOSABLE TANK ELECTRONIC CIGARETTE, METHOD OF MANUFACTURE AND METHOD OF USE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM/RELATED APPLICATION

This application is *a continuation reissue of U.S. application Ser. No. 17/868,699, filed on Jul. 19, 2022, which is a continuation reissue of U.S. application Ser. No. 17/555,231, filed on Dec. 17, 2021, which is a continuation reissue of U.S. application Ser. No. 17/332,074, filed on May 27, 2021, which is a reissue of U.S. Pat. No. 10,299,513, which issued on May 28, 2019 from U.S. patent application Ser. No. 15/516,005, which is* a national stage application of International Patent Application No. PCT/US2015/053836, filed on Oct. 2, 2015 and titled "DISPOSABLE TANK ELECTRONIC CIGARETTE, METHOD OF MANUFACTURE AND METHOD OF USE" which claims priority to U.S. Provisional Application No. 62/059,095, filed Oct. 2, 2014 and titled "DISPOSABLE TANK ELECTRONIC CIGARETTE, METHOD OF MANUFACTURE AND METHOD OF USE"; all of which are hereby incorporated by reference in their entirety.

*Notice: More than one reissue application has been filed for the reissue of U.S. Pat. No. 10,299,513. The reissue applications include the present continuation reissue application and U.S. application Ser. No. 17/868,699, filed Jul. 19, 2022, U.S. application Ser. No. 17/555,231, filed Dec. 17, 2021 and U.S. application Ser. No. 17/332,074, filed on May 27, 2021, which is a reissue application of U.S. Pat. No. 10,299,513.*

FIELD

The disclosure relates generally to an electronic cigarette and more specifically to an electronic cigarette having a disposable tank.

BACKGROUND

Recently, electronic cigarettes have become popular as it provides an alternative to tobacco and cigar smoking. An electronic cigarette is a device that contains liquid containing nicotine that is then vaporized by the electronic cigarette to allow the user to have the sensation of smoking in public places and receive the nicotine buzz without the other harmful side effects of smoking a regular cigarette or cigar.

Most electronic cigarettes sold today have a tank that the user must manually refill the liquid in the tank. The liquid for the electronic cigarette is commonly known as eLiquid and contains nicotine and may also contain other ingredients including flavoring and the like. The manual filing of the liquid into the tank is messy and puts the user in contact with the messy/sticky, nicotine-containing eLiquid. While the eLiquid is not toxic as the normal level of exposure, a user must go undergo this manually refilling process frequently to use what is known as a top "open-tank" system. This manually refilling process invariably leaves residue on the fingers of the user and in the various tanks and battery systems that are part of the open-tank systems.

With these open-tank systems, the replacement of the atomizers (wicks and coils) when they burn out (about once per week) is complicated and requires practice or the assistance of a specialist. Further, for open-tank systems that have a tubular design ("tubular device designs"), the tubular device designs are clumsy, roll off of surfaces they are placed on and are not easily pocketable.

Most of these open-tank systems use an industry standard 510 connection to connect the tank containing the liquid to the mouthpiece. The standard 510 connection is a weak-point for attachment of tanks to the battery units. Furthermore, attaching the tank by screwing the tank onto the rest of the device is not the most efficient attachment method and the connection is easily broken if a user has a device in their pocket and sits on it, for example. In addition, this connection may leak liquid which can cause a significant mess such as when the electronic cigarette is stored in a bag during airline travel or when the electronic cigarette is being carried by the user.

In addition, the swapping of flavors of the eLiquid for open tank systems is difficult. Specifically, since a tank can only hold one flavored liquid at a time, a user must have several costly tanks to swap flavors or the user must dump out the old liquid, wash and clean the tank and then re-fill it. This means that being able to use various flavored eLiquid in an open-tank system is either costly or messy and time-consuming.

Some systems use a custom bottle that attaches to the bottom of the battery unit in order to avoid exposure by the user to the eLiquid. However, while this design makes it easier to swap flavors, these systems still require the user to manually replace atomizers.

DETAILED DESCRIPTION OF ONE OR MORE EMBODIMENTS

The disclosure is particularly applicable to an electronic cigarette device having a disposable tank with the design set forth below and it is in this context that the disclosure will be described. It will be appreciated, however, that the device, method for manufacture and method of use has greater utility since the device may have other configurations that are within the scope of the disclosure, other methods for operations that are within the scope of the disclosure and the like so that the embodiments described below are merely illustrative of the teachings of the disclosure.

The electronic cigarette device may have one or more atomizers (e.g., wicks and heating element) built into a disposable tank with the eLiquid completely sealed out of the reach of the user that is a much more effective solution than anything currently available.

FIGS. 1A-1G are a top view, perspective left side back view, left side view, plan back view, right side view, perspective right side back view and a bottom view, respectively, of an embodiment of a disposable tank electronic cigarette device 100. The device 100 may have a housing 102 that is made of an appropriate material like plastic or metal. The housing may house various components of the device 100 and may be, for example, the size that is smaller than a deck of cards. A disposable tank 104 may be removable attached to the housing. The disposable tank 104 may be made of the same material as the housing. The disposable tank 104 may store eLiquid that is vaporized by the device 100 as described below. The disposable tank 104 may be discarded when there the eLiquid within the tank 104 is exhausted or the user wants to change the type of eLiquid being vaporized. As described below in more detail, the tank may include the atomizing elements. Furthermore, the tank may have various different shapes and configurations. For the embodiment shown in FIGS. 1A-1G, the tank may have a hollow rectangular shape so that it can fit into the housing 102 and hold the eLiquid.

The disposable tank 104 may be a closed tank system in which the eLiquid is stored in a separate compartment from the housing 102 until the disposable tank 104 is connected to the housing 102 that includes the other components of the device 100. The closed tank system means that the eLiquid stays separate from the heating element of the device 100 during transport. Furthermore, when the disposable tank 104 is removed from the housing 102, the disposable tank 104 reseals itself so that the liquid does not leak.

Figure 1A:
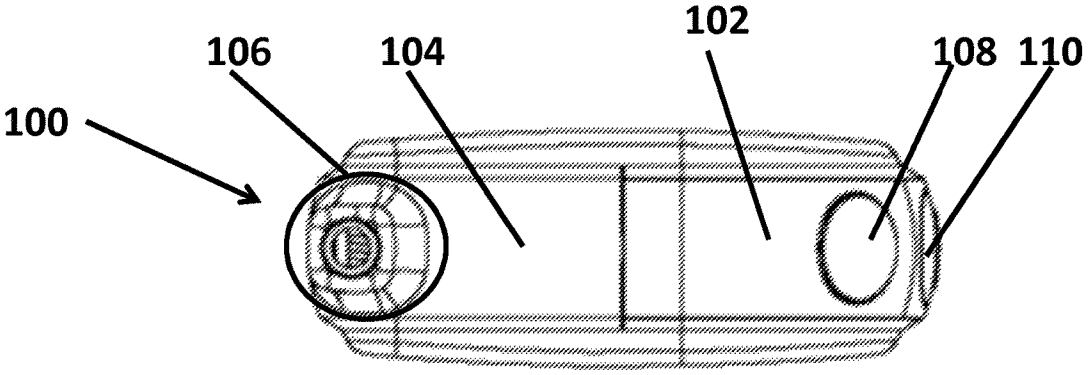
FIGS. 1A-1G are a top view, perspective left side back view, left side view, plan back view, right side view, perspective right side back view and a bottom view, respectively, of an embodiment of a disposable tank electronic cigarette.
Figure 1G:
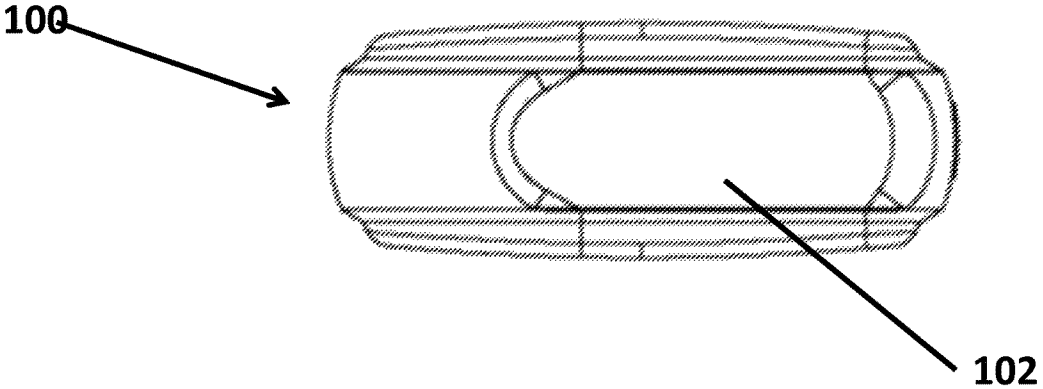
Figure 1C:
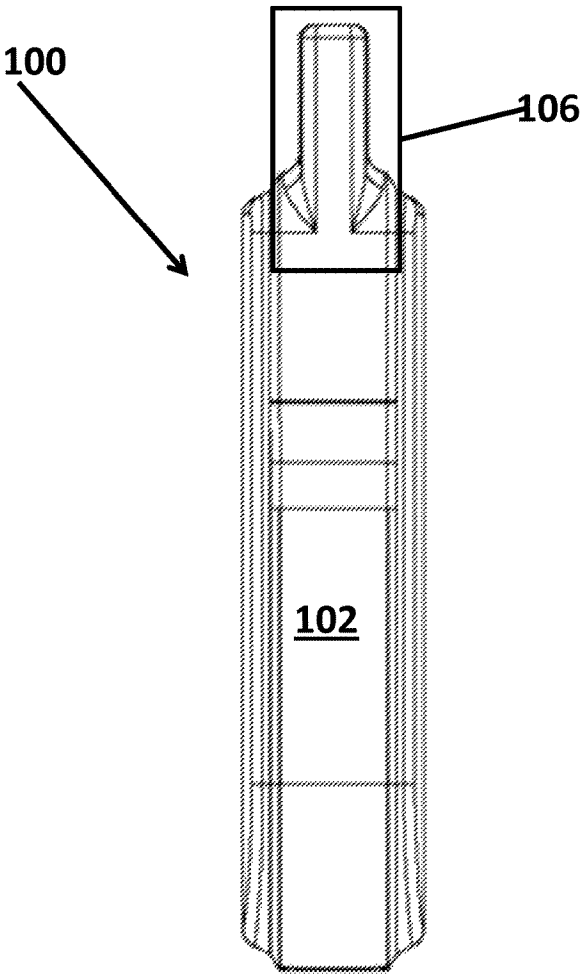
Figure 1B:
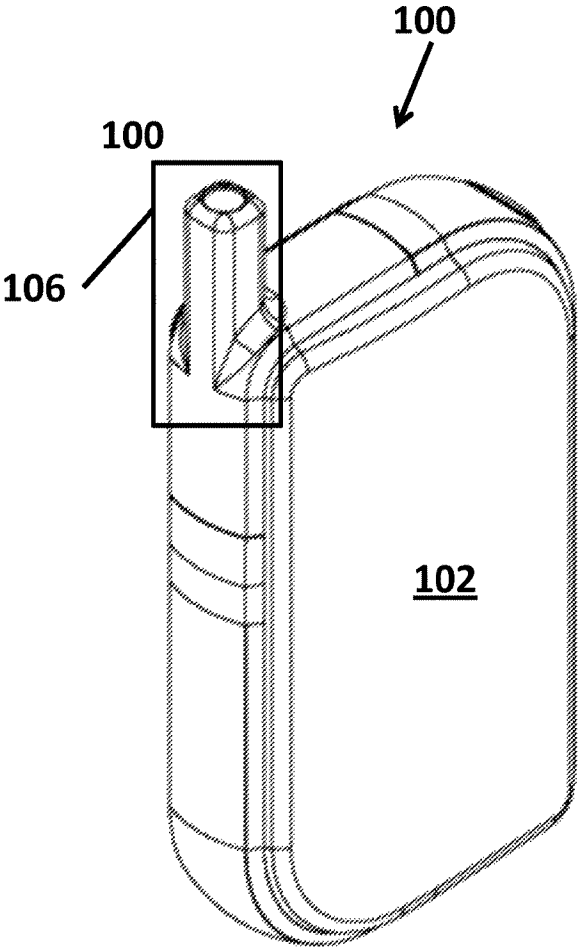
Figure 1F:
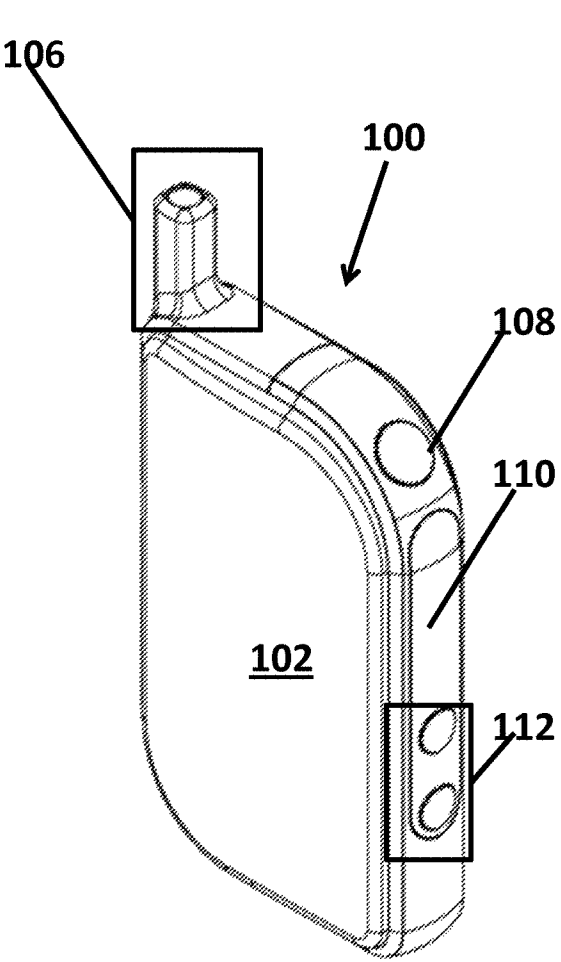
Figure 1E:
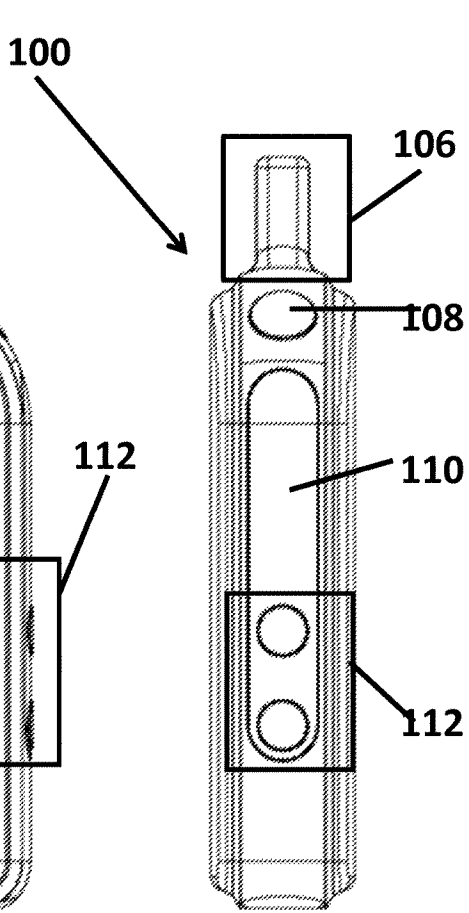
Figure 1D:
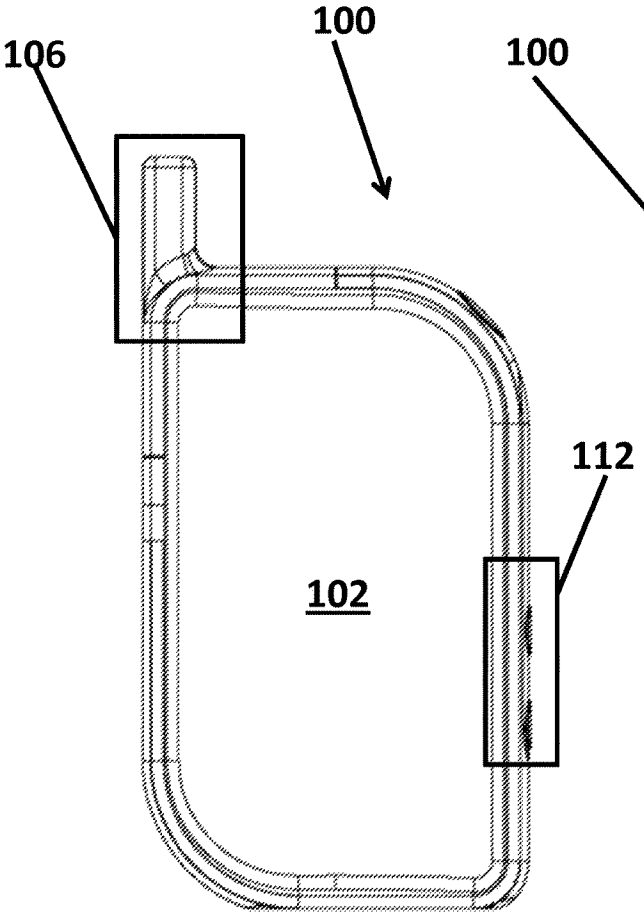

The tank 104 may have a mouthpiece portion 106 that may be located at various locations on the tank. In the embodiment shown in FIGS. 1A-1G, the mouthpiece is located adjacent a side of the tank. The housing 102 may have a user interface device 108, such as a button, that permits the user to turn on or off the device 100. In addition, the user interface device 108 may be depressed/activated to cause the atomizer element to activate and vaporize some of the eLiquid so that the user can inhale/suck in the vaporized eLiquid through the mouthpiece portion 106. The user interface device 108, in the embodiment shown in FIGS. 1A-1G may be located on top of the housing as shown in FIGS. 1A, 1E and 1F, but the user interface device 108 may also be located on other parts of the housing.

In one embodiment, the user interface device 108 may be used to turn on the device, such as by depressing the user interface device 108 three times in rapid succession. The device 100 can also be turned off by using the same 3-press sequence. After the device is in the "on" mode, a single press of the user interface device 108 may place the device 100 in a "fire" mode which means power will be transmitted through the 2 metal "posts" on the device in contact with the metal coil on the disposable tank when the tank is installed. This power to the coil is what will cause that element to heat up and thus vaporize the liquid being wicked from the tank. The release of the user interface device 108 may immediately stop current flow and stop vaporization.

The device 100 may also have a display screen 110 that may display various data about the device 100. For example, in one embodiment, the display 110 may display the current wattage of the power being applied to the atomizer to vaporize the eLiquid and the battery power remaining for the device 100. The display 110, in the embodiment shown in FIGS. 1A-1G may be located on a side of the housing as shown in FIGS. 1E and 1F, but the display 110 may also be located on other parts of the housing. The housing may also have a set of controls 112, such as buttons, that allow the user to adjust the power level of the device. The set of controls 112, when activated, send a signal to the device's software to regulate how much power flows to the tank's coil next time the main button is pressed to fire the device 100. Each press either up or down sets a new upper limit to the wattage. A user will set the wattage level based on personal preference as each setting potentially change the flavor experience when using the device 100. The set of controls 112, in the embodiment shown in FIGS. 1A-1G may be located on a side of the housing as shown in FIGS. 1E and 1F, but the set of controls 112 may also be located on other parts of the housing.

Figure 2:
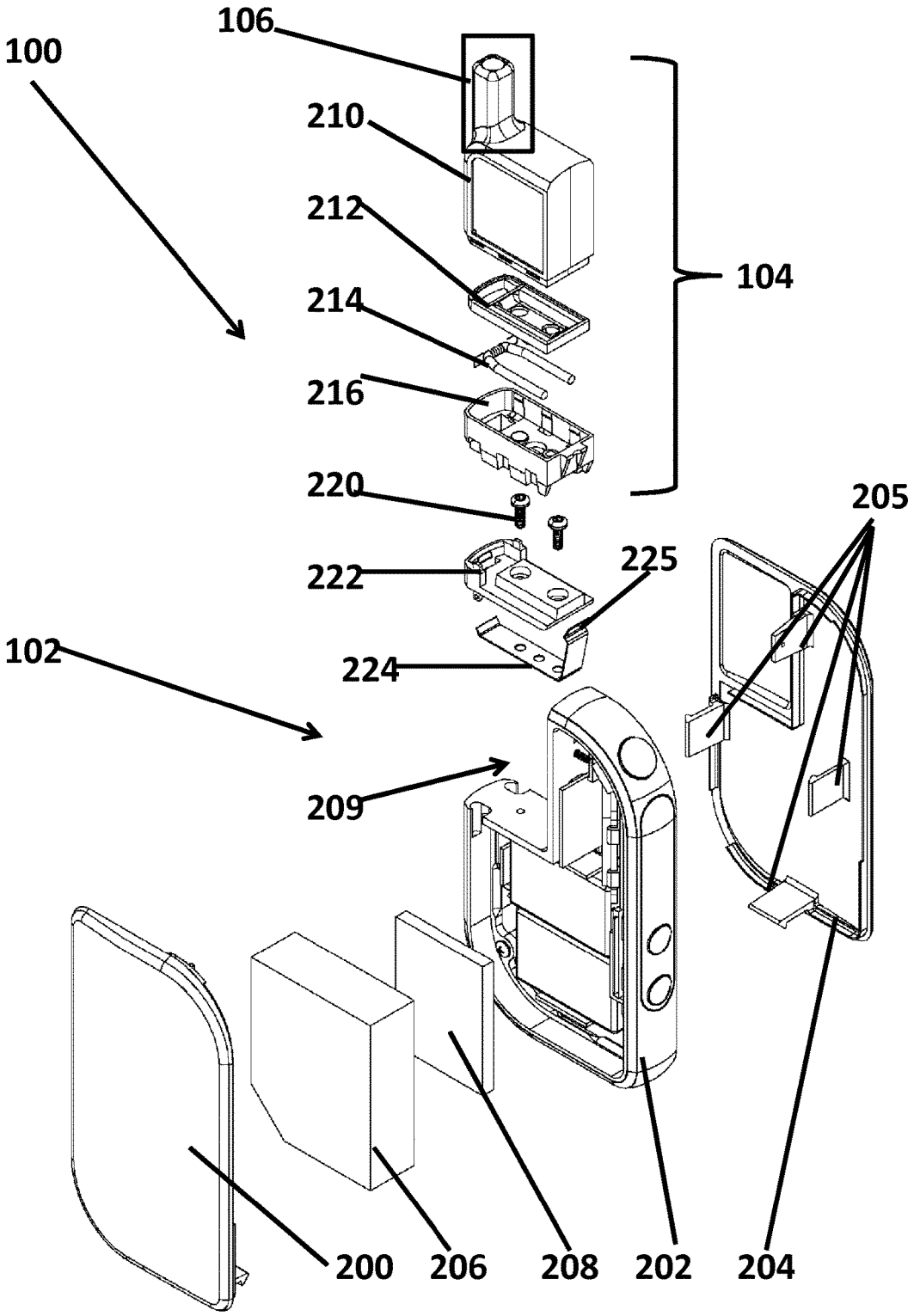
FIG. 2 is an exploded assembly diagram of the disposable tank electronic cigarette.

FIG. 2 is an exploded assembly diagram of the disposable tank electronic cigarette 100. As shown, the housing 102 may further comprise a first outside portion 200, a middle portion 202 and a second outside portion 204 that fit together to form the housing 102 that has a tank receptacle 209 once the housing is assembled for the disposable tank. The tank receptacle 209 may be opposite the display 110 and may receive a user-inserted disposable tank. The disposable tank 104 may be secured into place by a tank spring on one side and held on the bottom and other side by the tank connector. The tank connector also contains metal posts that pass through it and connect to the atomizer coil when the tank is inserted by the user.

The second outside portion may have one or more detents 205 that mate with the first outside portion 200 to connect the first outside portion 200, the middle portion 202 and the second outside portion 204. As shown in FIG. 2, the assembled housing 102 may further have a battery 206 that provides power to the device 100 and a circuit board 208 that contains the electronics and wiring to provide power to each component, such as the atomizer element, the user interface features and the display and control each of these components. The circuit board 208 may, for example, have at least one microprocessor or microcontroller, memory and software that is stored in the memory and executed by the processor to manage the operations of the circuits in the device 100.

Figure 3:
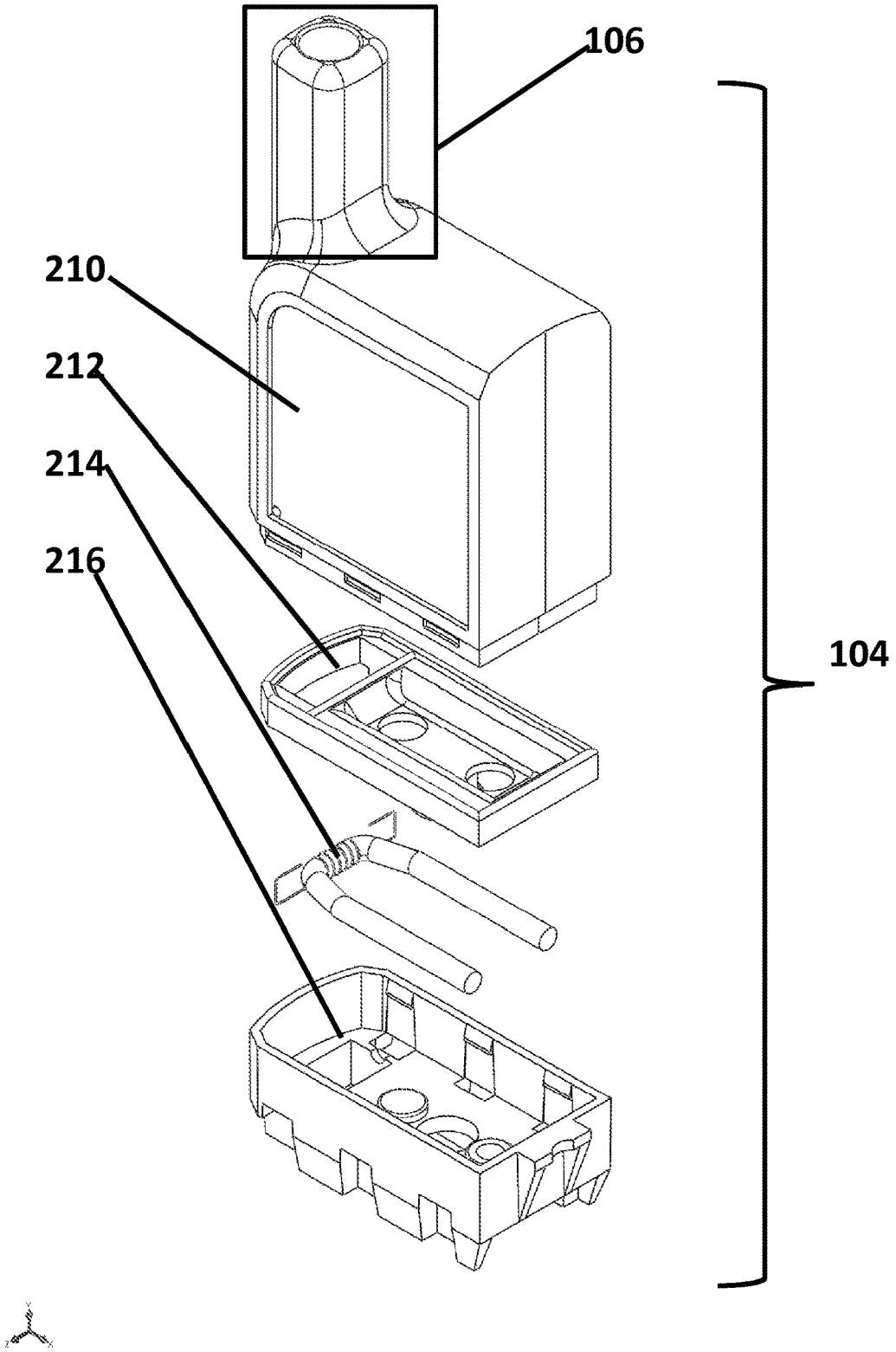
FIG. 3 illustrates more details of the disposable tank of the disposable tank electronic cigarette.

FIG. 3 illustrates more details of the disposable tank of the disposable tank electronic cigarette. As shown in FIGS. 2 and 3, the disposable tank 104 may further comprise a tank body 210 that has the mouthpiece 106 and contains an eLiquid. The disposable tank 104 may further comprise an intermediate portion 212, the atomizer element 214 (that may include a heater element and a wick element as described below in more detail) and a tank well portion 216 into which the atomizer element 214 is secured. The intermediate portion 212 may be made of silicone. The intermediate portion 212, the atomizer portion 214 and the lower portion 216 are connected together. The intermediate portion 212, the atomizer portion 214 and the tank well portion 216 ensure that the eLiquid does not leak from the tank, houses the atomizer portion 214 and routes and permits the eLiquid to come into contact with the atomizer portion 214 to vaporize the eLiquid. The eLiquid is released from the disposable tank 104 and can be vaporized when the disposable tank 104 is inserted into the housing 102, for example. The intermediate portion 212, the atomizer portion 214 and the tank well portion 216 may also provide a receptacle if any eLiquid leaks. In some embodiments, the tank 104 (and its parts) may be pre-assembled, pre-filled with eLiquid and sealed before coming in contact with the user. In one embodiment, the choice of tank body materials and atomizer components may be chosen assuming that the disposable tank will be discarded after about 24 hours of use for a normal user.

The tank body 210 may be made of a plastic polycarbonate-like material designed to hold various formulas of liquid safely while prevent leaking or cracking of the tank. The intermediate portion 212 that seals the atomizer portion 214, the tank body 210 and the tank well 216 to each other may be made of silicone. The intermediate portion 212 may also contain a groove which holds the atomizer element 214.

Figure 4:
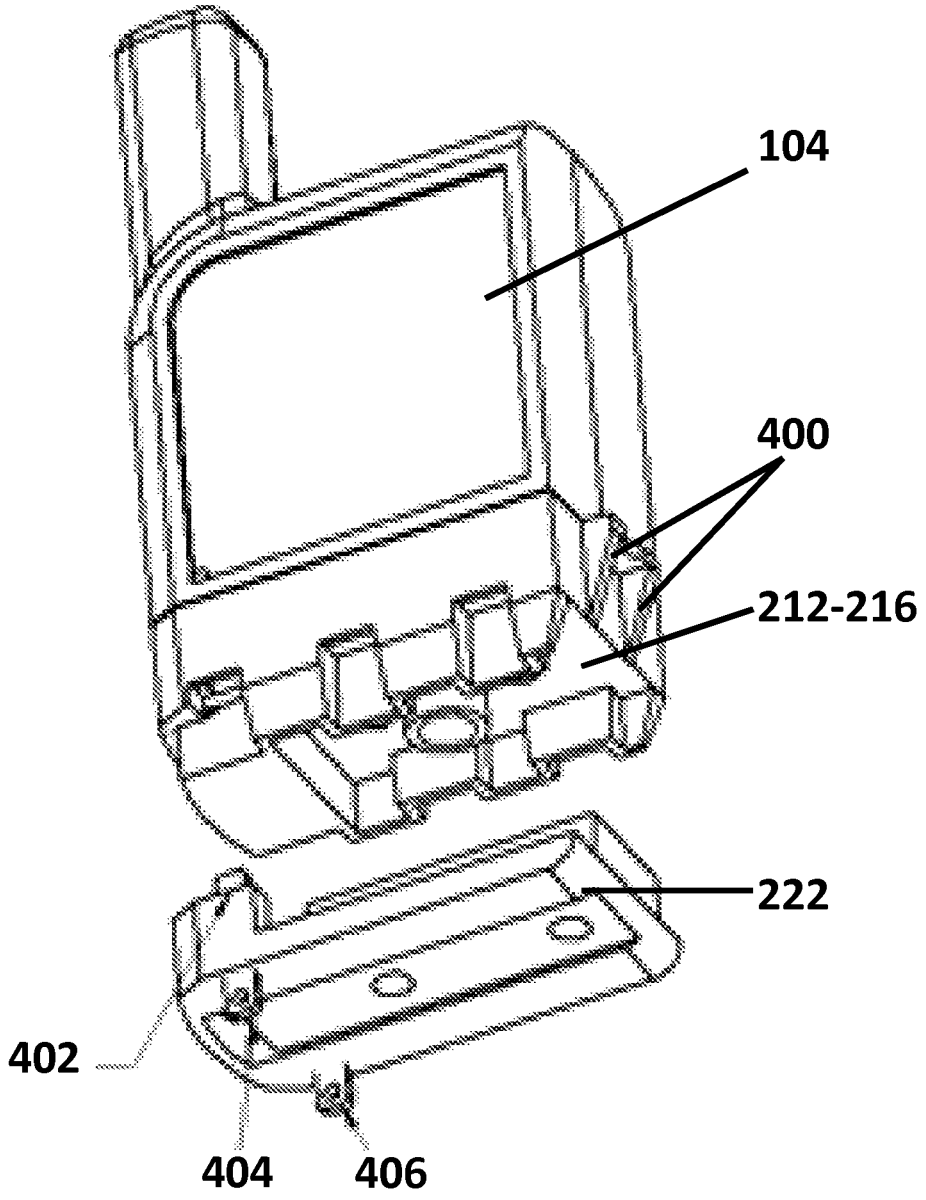
FIG. 4 illustrates more details of a bottom portion of the disposable tank and the tank connector on the electronic cigarette.

Returning to FIG. 2 and as shown in FIG. 4, the housing 102 may further comprise one or more metal posts 220 and a bottom portion 222 into which the one or more posts 220 are connected. The housing may also have a metal strip 224 that is electrically connected to the one or more posts 220. The one or more metal posts 220, the bottom portion 222 and the strip 224 may be secured to the housing. The strip 224 may have an elbow region 225 (biased by a spring force of the metal away from the wall of the housing 102) that sits against the housing when installed in the housing 102 and provides a snap fitting connection between the housing 102 and the disposable tank 104. The elbow region 225 is not shown in FIG. 4. For example, as shown in FIG. 4, the assembled regions 212-216 may have one or more shoulder regions 400 into which the elbow region 225 may snap when the disposable tank 104 is installed in the housing.

As further shown in FIG. 4, the bottom portion 222 may hold a set of upper posts 402 (on an upper side of the bottom portion 222) that make contact with the atomizer element 214 (and provide electrical energy when activated) when the disposable tank 104 (that includes the atomizer element 214) is installed in the housing. The bottom portion 222 may further comprise a positive terminal 404 and a negative terminal 406 on a bottom side of the bottom portion 222 that connect to the power source in the housing 102 and thus provides the connection from the power source to the set of upper posts 402.

As shown in FIG. 2, the middle/central portion 202 may be made of plastic or metal and may act as the element to which various other elements of the housing are connected. To facilitate this, the central portion 202 may have an interior rack to which the other internal components are attached. For example, the interior rack may hold the power source, such as a battery, circuit boards and inductive charging receiver coil that allows the power source to be recharged using well known inductive coupling charging. On an interior-side of the device 100, there may be the display 110 that may be an OLED display screen that may show the device current status and display the state of the various user-customizable settings. The display 110 may be viewed through the display lens on the side of the device. The first and second outside portion 200, 204 may be side-panels that are both decorative and practical. The outside portions may help seal the device 100 from mild exposure to debris and the elements. In addition, the user can replace these panels with various aftermarket designs to suit their tastes.

The device 100 may be assembled in different manners that are within the scope of the disclosure. For example, the process to assemble the housing may include: a) internal rack is screwed into outer frame; b) circuit boards and buttons are inserted into the device and attached to the internal rack; c) display lens is inserted on the inside-side of the device and the display is placed inside the lens; d) battery is inserted onto the rack and connected to the circuit boards; e) inductive charging coil is attached to the charging circuits and the battery; f) tank connector with metal posts, and tank spring are screwed into the device frame; and g) metal posts are wired to the circuit boards for power. For example, the process of assembling the disposable tank 104 may include: a) atomizer element 214 may be fit into groves molded in the intermediate portion 212; b) the tank body 210, the intermediate portion 212 and the tank well 216 may be sandwiched together creating a water-tight seal; c) the tank may be permanently sealed around its outer edges using sonic welding. In some embodiments, the bottom of the tank well 216 may have an absorbent material to catch any excess fluid that may accidently escape the bottom of the intermediate portion 212. This absorbent material may be cut such that the shape will not interfere with the pressure the Tank Connector creates when the User attaches the into the device.

Figure 5A:
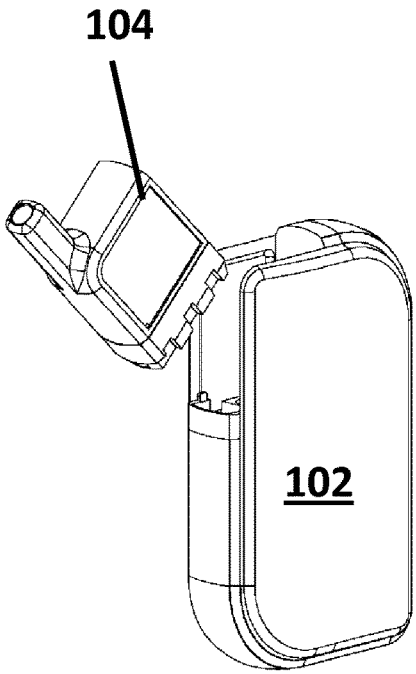
FIGS. 5A-5C illustrate a perspective view of the disposable tank being installed in the housing.
Figure 5B:
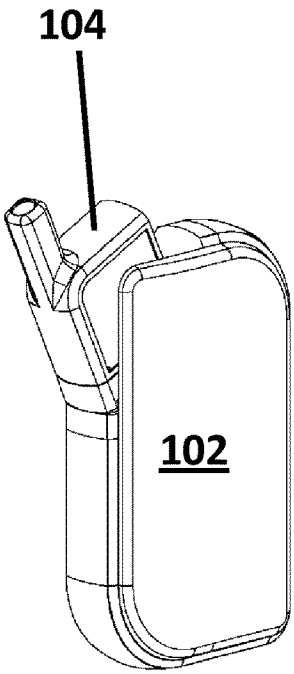
Figure 5C:
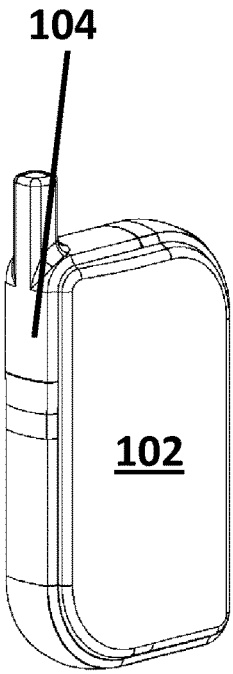
Figure 6A:
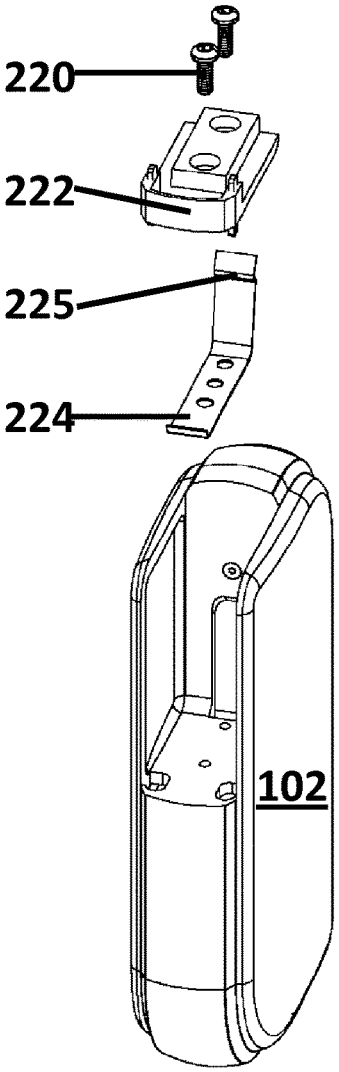
FIGS. 6A-6C illustrate a side view of the disposable tank being installed in the housing.
Figure 6B:
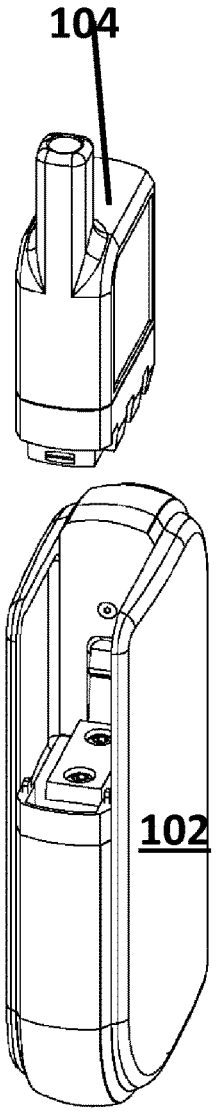
Figure 6C:
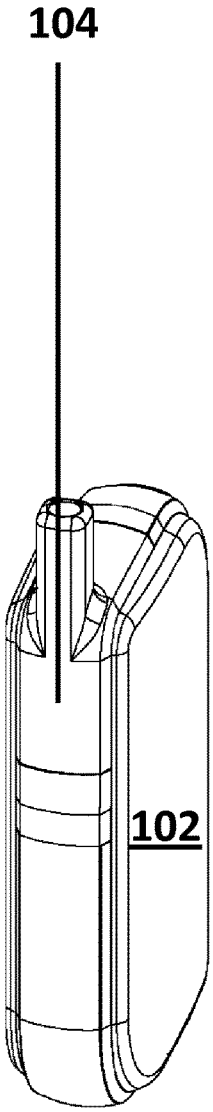
Figures 7A, 7B, 7C:
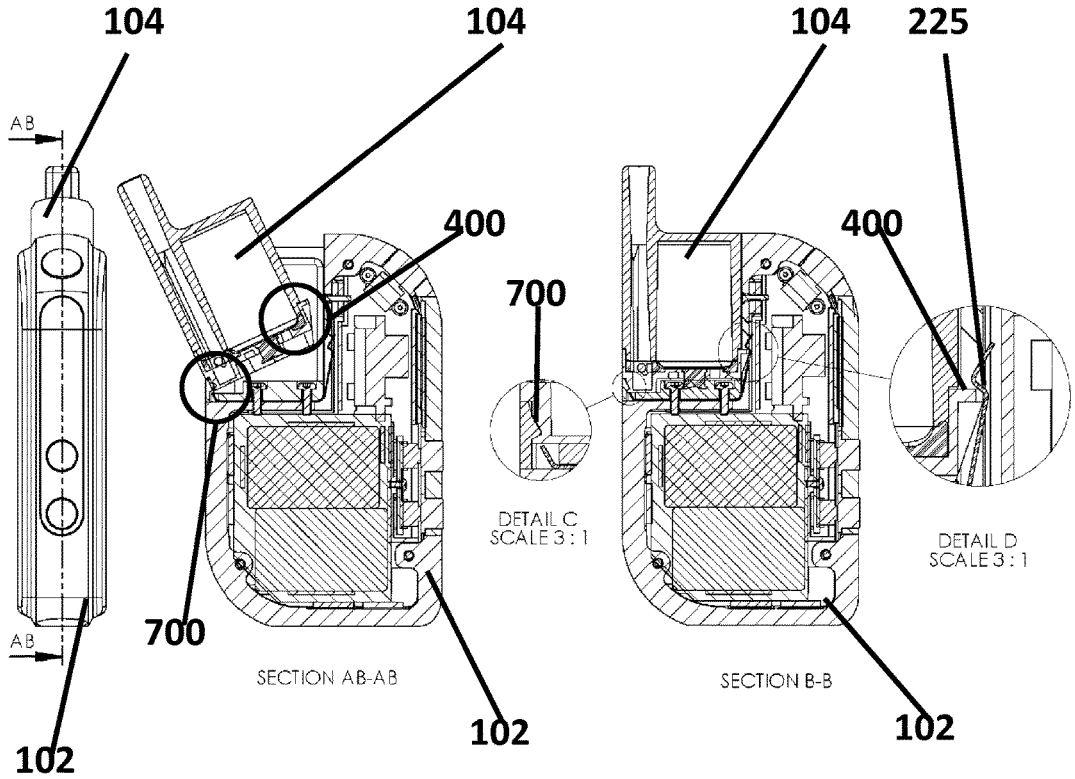
FIGS. 7A-7C illustrate more details of the disposable tank being installed in the housing.

FIGS. 5A-5C illustrate a perspective view of the disposable tank 104 being installed in the housing 102 and FIGS. 6A-6C illustrate a side view of the disposable tank 104 being installed in the housing 102. FIGS. 7A-7C illustrate more details of the disposable tank 104 being installed in the housing 103. As shown in FIGS. 5A-6C, a disposable tank is being installed into the housing 102. In FIG. 6A, the one or more metal posts 220, the bottom portion 222 and the strip 224 are installed into the housing 102 and secured to the housing as shown in FIG. 6B. As shown in FIG. 7B, the housing 102 may have a shoulder region 700 that helps to retain the disposable tank 104 in the housing. As shown in FIG. 7C in detail C and detail D, when the disposable tank 104 is installed in the housing 102, the shoulder region 700 interfaces with a portion of the disposable tank 104 and the spring biased elbow region 225 of the strip 224 may interface with the one or more shoulder regions 400 of the housing 102 to create a friction fit to hold the disposable tank 104 in the housing 102. However, the friction fit may be overcome by a user applying force to remove the disposable tank 104.

Figure 8:
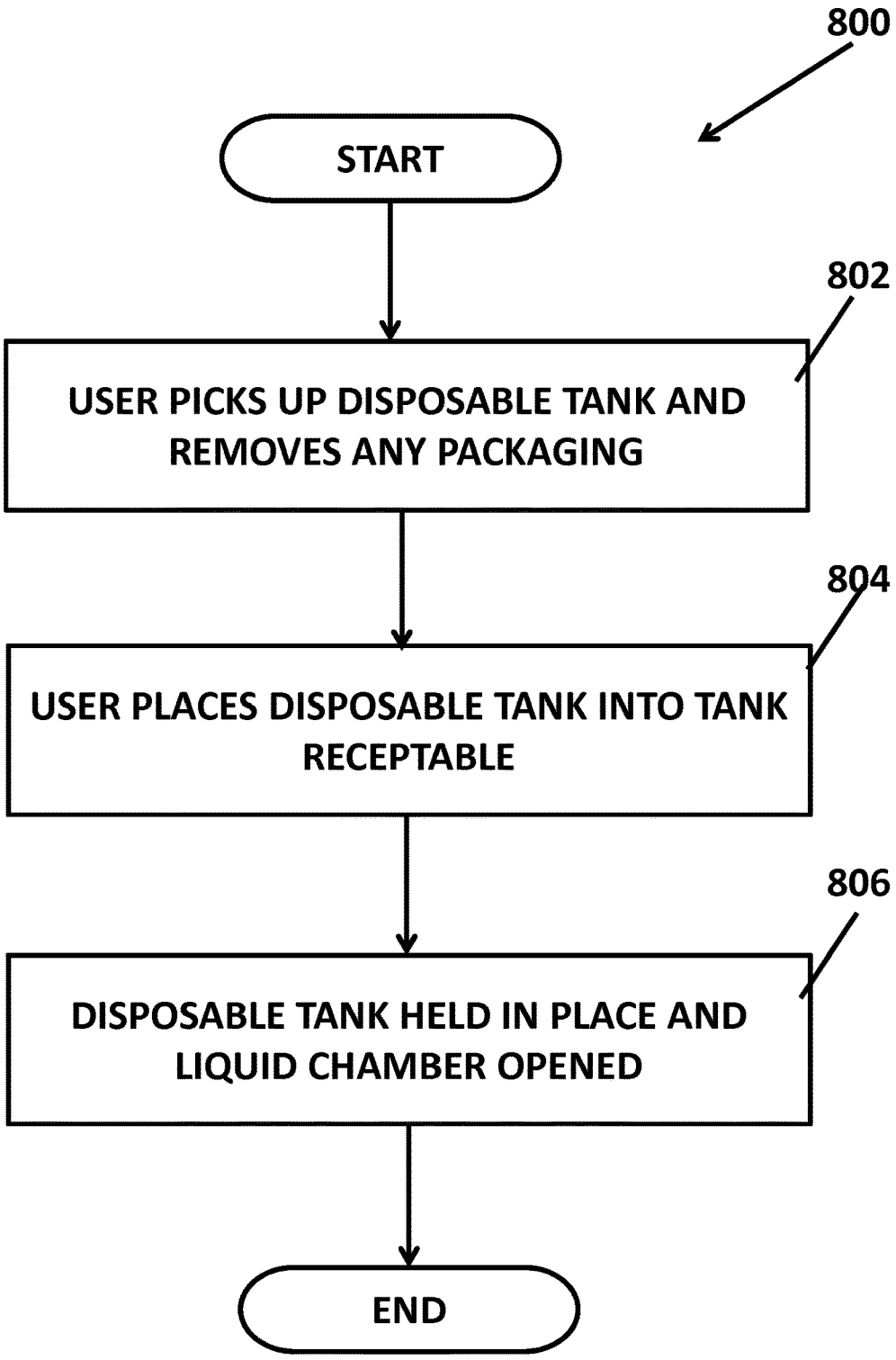
FIGS. 8 and 9 illustrate a method for inserting a disposable tank onto the electronic cigarette and a method for removing a disposable tank from the electronic cigarette, respectively.
Figure 9:
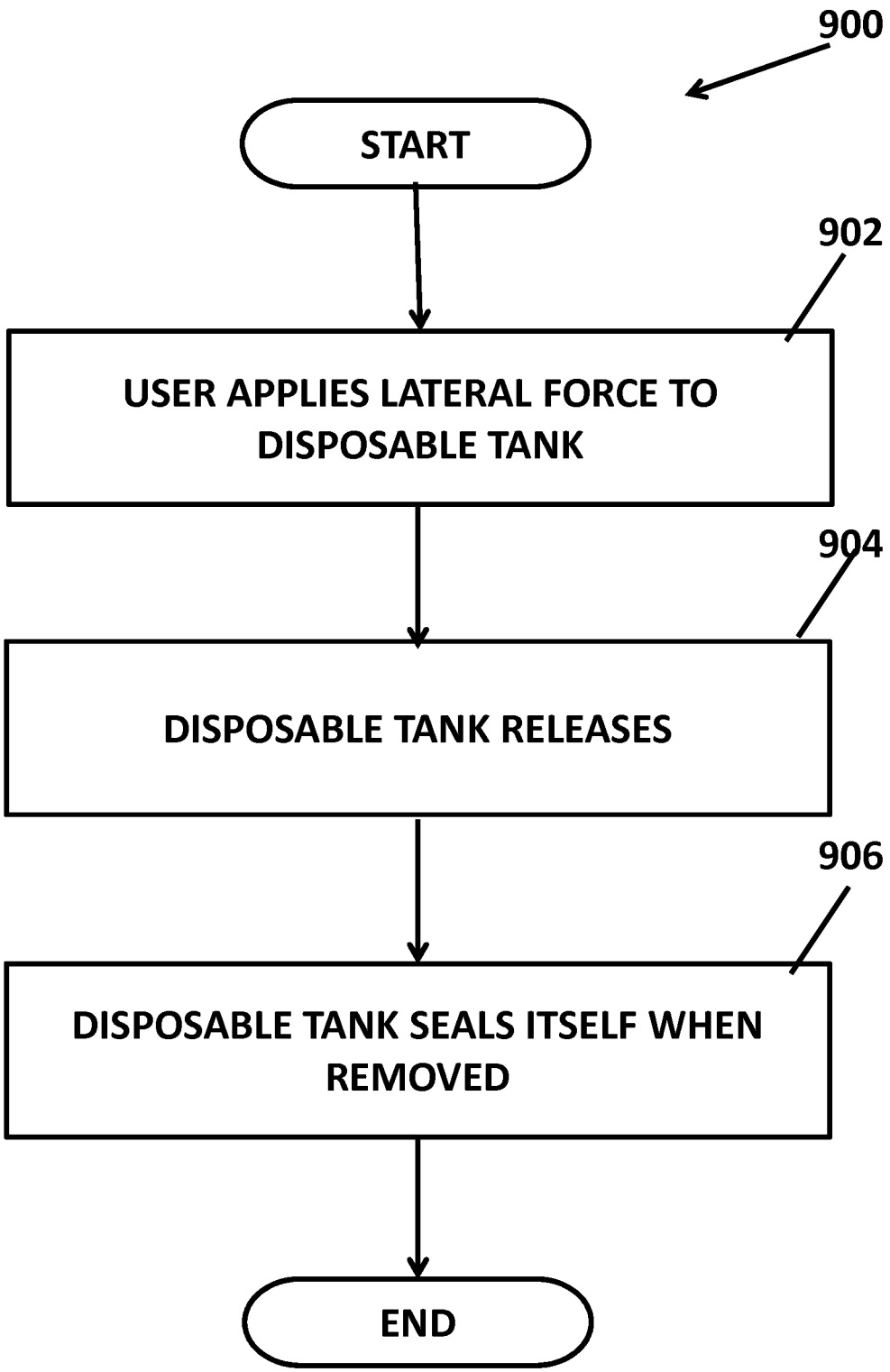

FIGS. 8 and 9 illustrate a method 800 for inserting a disposable tank onto the electronic cigarette and a method 900 for removing a disposable tank from the electronic cigarette, respectively. As shown in FIG. 8, the method 800 for inserting the disposable tank may include a user obtaining a disposable tank and removing any packaging (802.) The user may then place the disposable tank into the tank receptacle of the housing (804). For example, the user may hook a bottom side corner of the tank on the shoulder region 700 and snaps the disposable tank into place. Alternatively, the user can drop the disposable tank straight onto the tank connector (the one or more metal posts 220, the bottom portion 222 and the strip 224 are installed into the housing 102) and snaps the disposable tank into place. In each case, the disposable tank 104 may be held in place by the appropriate level of force from the elbow 225 and the tank connector. Once the tank is inserted, pressure from the tank connector on the intermediate portion may start the flow of liquid into the atomizing chamber (806.)

As shown in FIG. 9, the method 900 may include a user applying a lateral force to the disposable tank (902) away from the housing. As a result of the force (that overcomes the force from the elbow 225 and the tank connector), the disposable tank may be released (904.) When the disposable tank is released, the intermediate portion may return to its neutral position stopping the wicking of liquid into the vaporization chamber so that the removed tank is sealed (906.) The user can then discard the tank and replace the tank with a new disposable tank.

Figure 10:
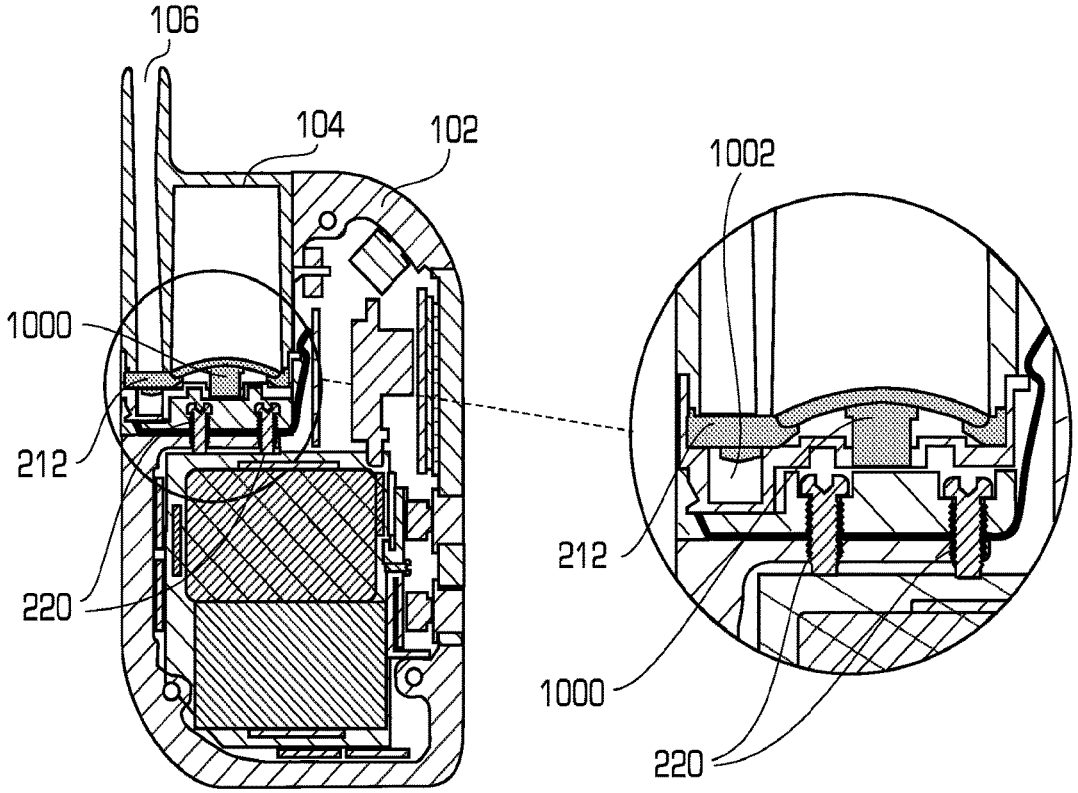
FIG. 10 illustrates a mechanism for sealing and unsealing the disposable tank.
Figure 11A:
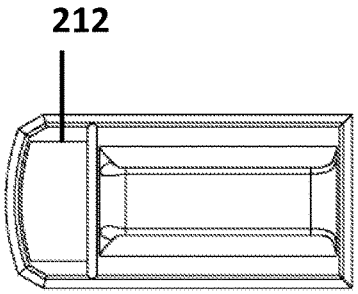
FIGS. 11A-11E illustrate more details of the intermediate portion of the disposable tank.
Figure 11B:
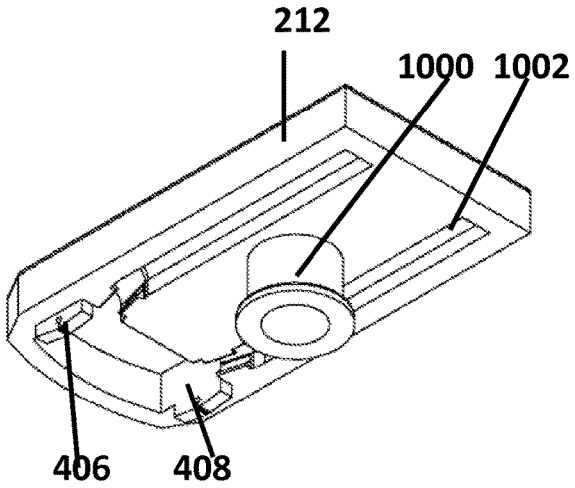
Figure 11C:
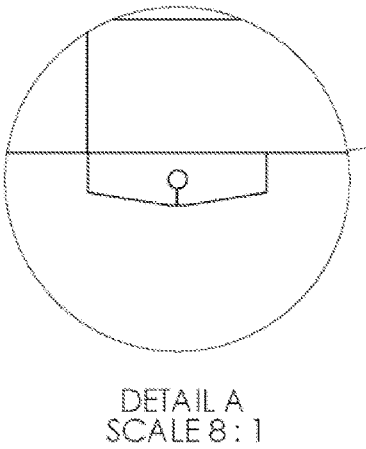
Figure 11C:
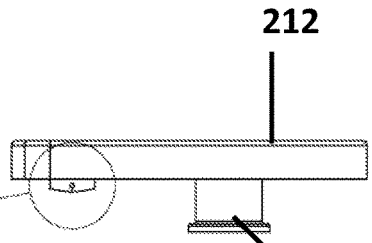
Figure 11D:
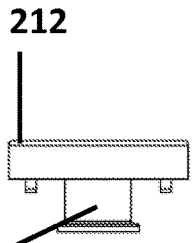
Figure 11E:
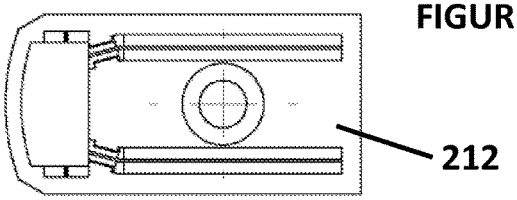

FIG. 10 illustrates a mechanism for sealing and unsealing the disposable tank 104 that has the mouthpiece 106. When the disposable tank 104 is installed in the housing, a post portion 1000 of the intermediate portion 212 is pushed up by a raised portion of the bottom portion 222 as shown which allows the liquid in the tank to flow down and wet the wick of the atomizer 214. Similarly, when the tank is detached from the housing 102, the post portion 100 returns to its closed position so that the tank is sealed.

As shown in FIG. 10, the tank well 216 may have a pooling reservoir and overflow tank 1002. In one embodiment, the pooling reservoir 1002 may be at the bottom left directly opposite the mouthpiece to hold any excess liquid that was wicked from the other side of the tank, but not vaporized. This space prevents fluid from flowing into other areas of the tank our out through the air hole and in contact with the user. Since the tank is disposable, it is only designed to hold any excess that may accumulate from a normal 24-hour use.

FIGS. 11A-11E illustrate more details of the intermediate portion 212 of the disposable tank. The intermediate portion 212 may have the terminals 406, 408 on the underside, the post portion 1000 and a groove 1002. Before a disposable tank 104 is attached to the housing 102, the components of the tank create a positive seal to prevent liquid from leaving the upper tank before it is inserted into the housing 102. The design of the tank's silicone part is such that as the tank is attached to the housing, it displaces the silicone inside the tank (by pressing on the post portion 1000) enough to start the liquid flow into the lower tank area containing the atomizing element 214. The pressure from the main device on the silicone of the inserted tank also causes the silicone to expand to create a secondary seal at the bottom of the tank to prevent liquid from flowing from the bottom of the tank into the main device.

The tank can be removed from the housing at any time, for example when a user wishes to switch to a tank with a different flavored liquid. Immediate upon removal of the tank, the inner silicone part returns to its previous sealed position creating a seal for the liquid once again. The result is that liquid will only flow when the tank is fully inserted into a suitable base unit and not when the tank is separated as in during shipment or after a partially used tank is manually removed.

Figure 12:
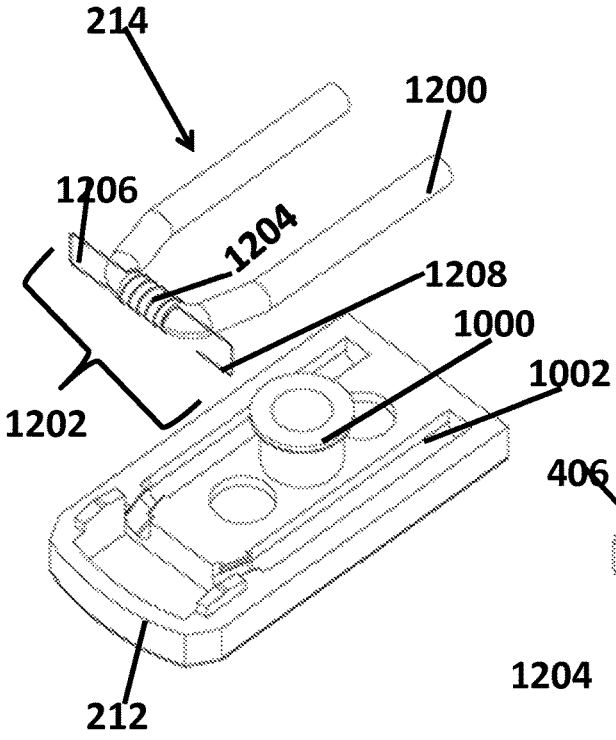
FIGS. 12 and 13 illustrate more details of the intermediate portion of the disposable tank with the atomizer portion.
Figure 13:
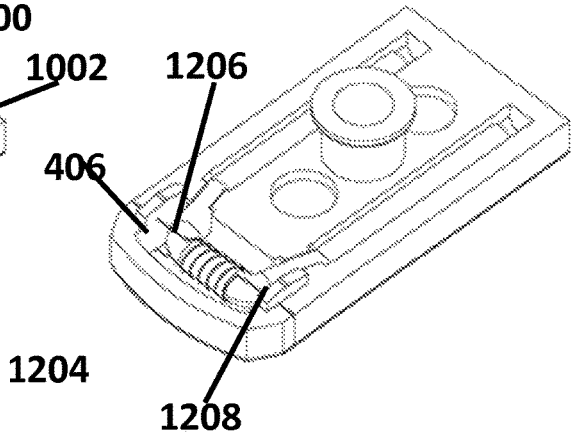
Figure 14:
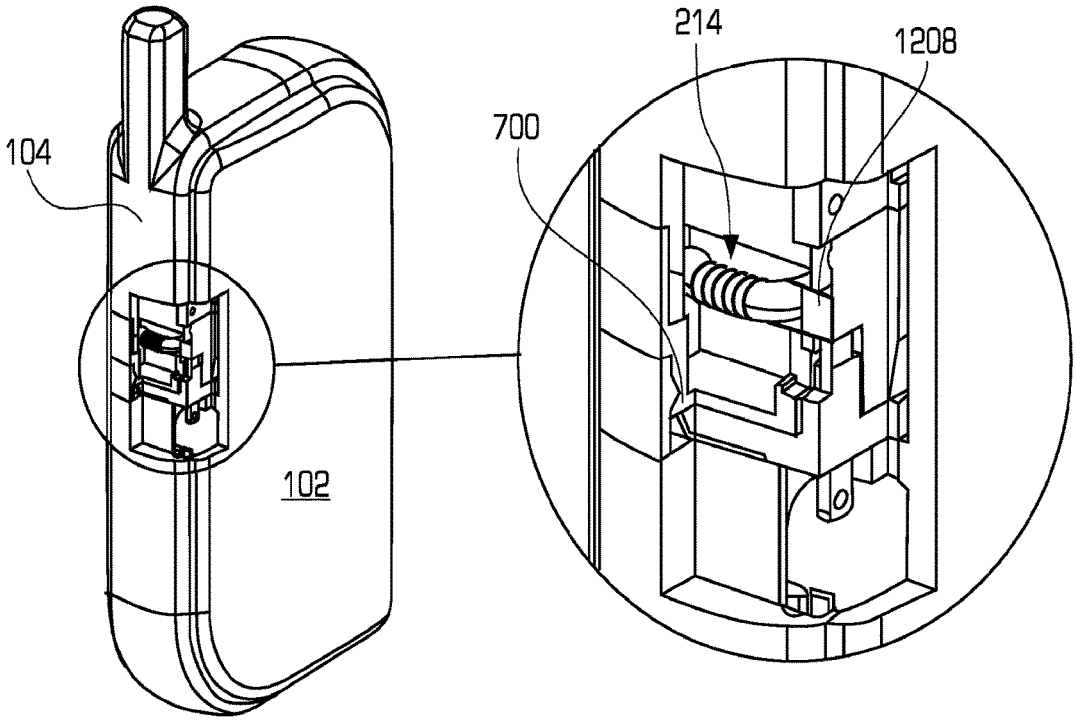
FIG. 14 illustrates details of the connection between the housing and disposable tank.

FIGS. 12 and 13 illustrate more details of the intermediate portion 212 of the disposable tank with the atomizer portion 214. The atomizer portion 214 may have a wick element 1200 that may be U-shaped. The atomizer portion 214 may also have a heating element 1202 that may be located, for example, at the middle of the U-shaped wick. In one embodiment, the heating element 1202 may further comprise a coil portion 1204 that vaporizes the eLiquid, a first electrode 1206 and a second electrode 1208 at each end of the coil portion. As shown in FIG. 13, when the atomizer portion 214 is placed into the intermediate portion 212, each electrode 1206, 1208 electrically connects to the terminals 406, 408. The terminals 406, 408 are electrically connected to the power source so that the atomizer portion 214 is also directly connected to the power source. In one embodiment, the wick 1200 may be made of silica, cotton or a ceramic material. Each electrode/wire 1206, 1208 and the coil portion 1204 may be made of nickel-chromium or other conductive metal. In another embodiment, the wick element 1200 and the heating element 1202 may be both made of a ceramic material that both wicks and heats the eLiquid. FIG. 14 illustrates details of the connection between the housing 102 and disposable tank 104 when the disposable tank 104 is installed in the housing 102.

Figure 15A:
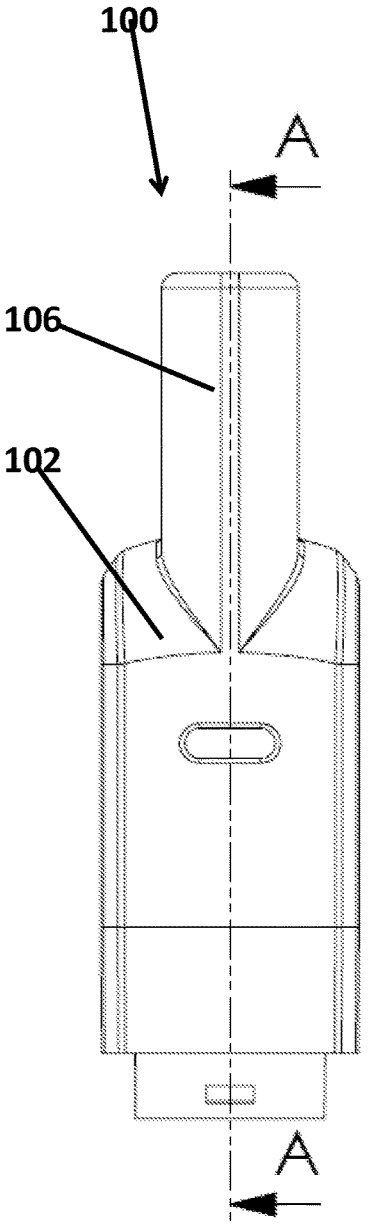
FIGS. 15A and 15B show a side view and a cutaway view of the disposable tank electronic cigarette showing the airflow.
Figure 15B:
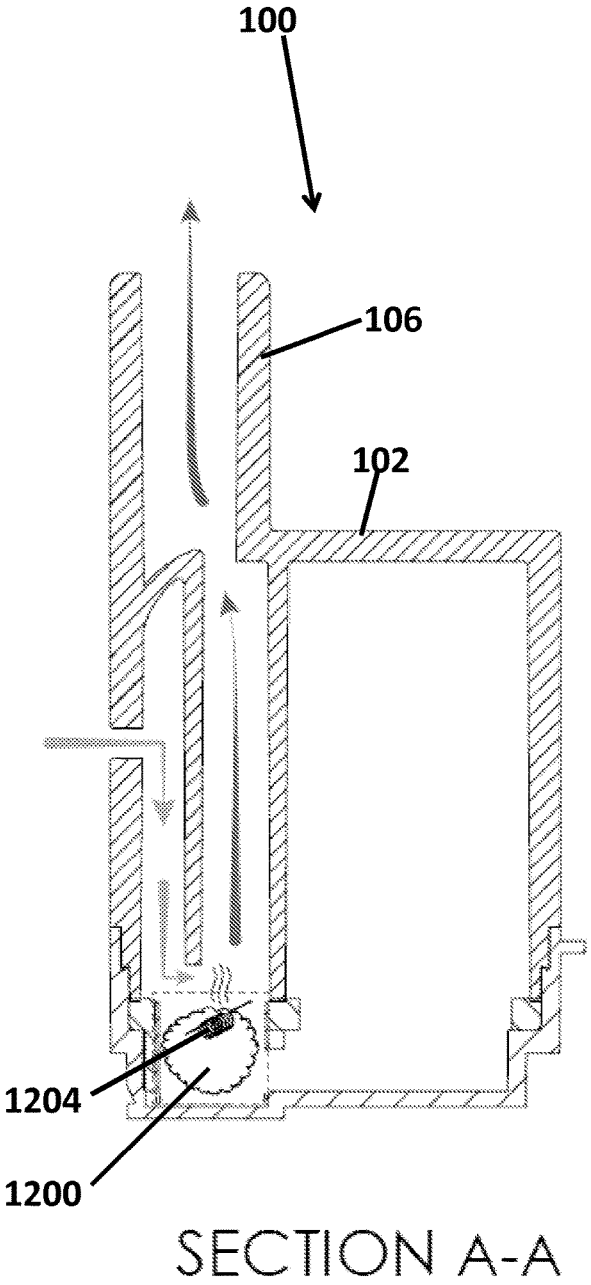

FIGS. 15A and 15B show a side view and a cutaway view of the disposable tank electronic cigarette showing the airflow. As shown, air for the device may enter an air input, travel downwards and interact with the wick element 1200 and the coil 1204 that generate the vaporized liquid that is inhaled by the user through the mouthpiece portion 106. The airflow shown in FIGS. 15A and 15B reduces the likleyhood of condensation in the system.

Figure 16:
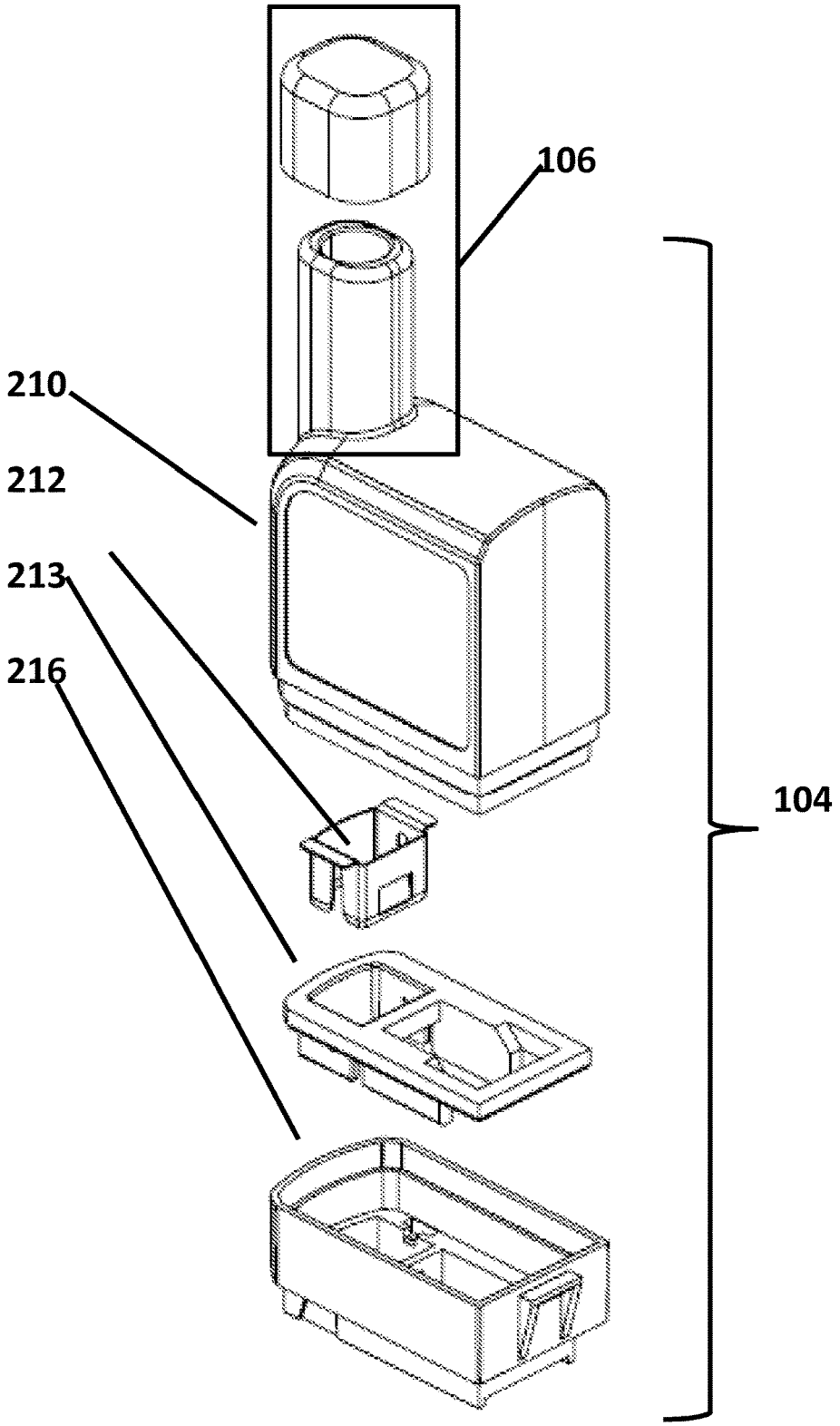
FIG. 16 illustrates another example of the tank body 210.

FIG. 16 illustrates another example of the tank body 210. The disposable tank 104 may further comprise a tank body 210 that has the mouthpiece 106 and contains an eLiquid. The disposable tank 104 may further comprise an intermediate portion 212, the atomizer element 213 (that may include a heater element and a wick element as described below in more detail) and a tank well portion 216 into which the atomizer element 214 is secured. The intermediate portion 212 may be made of silicone. The intermediate portion 212, the atomizer portion 214 and the lower portion 216 are connected together. The intermediate portion 212, the atomizer portion 214 and the tank well portion 216 ensure that the eLiquid does not leak from the tank, houses the atomizer portion 213 and routes and permits the eLiquid to come into contact with the atomizer portion 213 to vaporize the eLiquid. The eLiquid is released from the disposable tank 104 and can be vaporized when the disposable tank 104 is inserted into the housing 102, for example. The intermediate portion 212, the atomizer portion 213 and the tank well portion 216 may also provide a receptacle if any eLiquid leaks. In some embodiments, the tank 104 (and its parts) may be pre-assembled, pre-filled with eLiquid and sealed before coming in contact with the user. In one embodiment, the choice of tank body materials and atomizer components may be chosen assuming that the disposable tank will be discarded after about 24 hours of use for a normal user.

The tank body 210 may be made of a plastic polycarbonate-like material designed to hold various formulas of liquid safely while prevent leaking or cracking of the tank. The intermediate portion 212 that seals the atomizer portion 213, the tank body 210 and the tank well 216 to each other may be made of silicone. The intermediate portion 212 may also contain a groove which holds the atomizer element 213.

Figure 17:
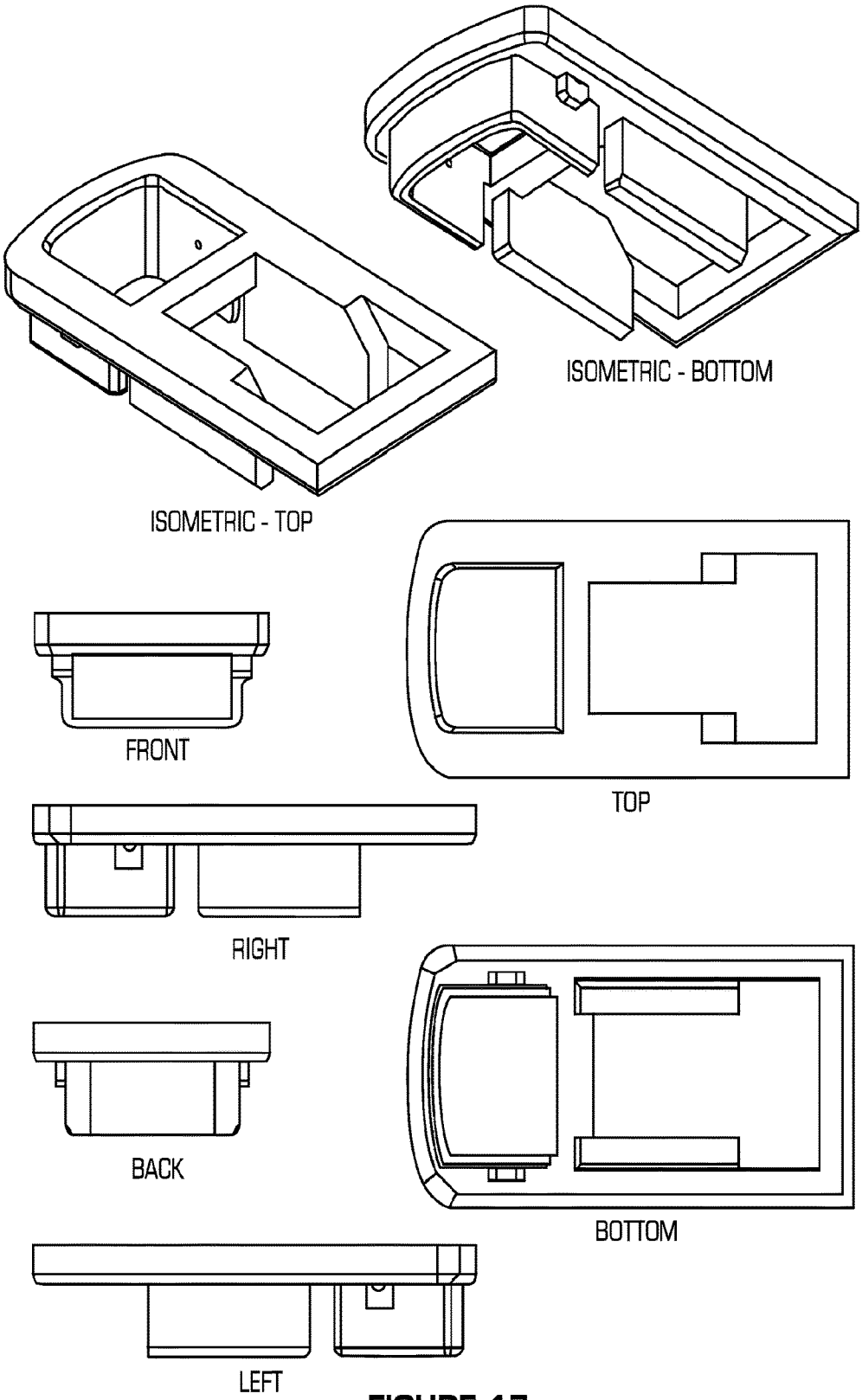
FIG. 17 illustrates more details of the atomizer element.
Figure 18A:
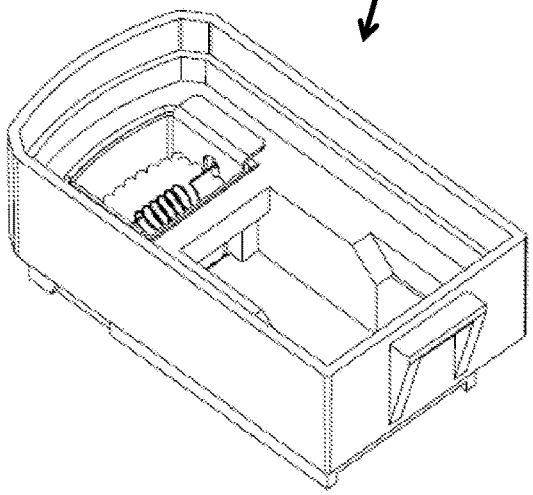
FIGS. 18A and 18B illustrate of the assembly of the atomizer element, the wick and the heater portion of the device.
Figure 18B:
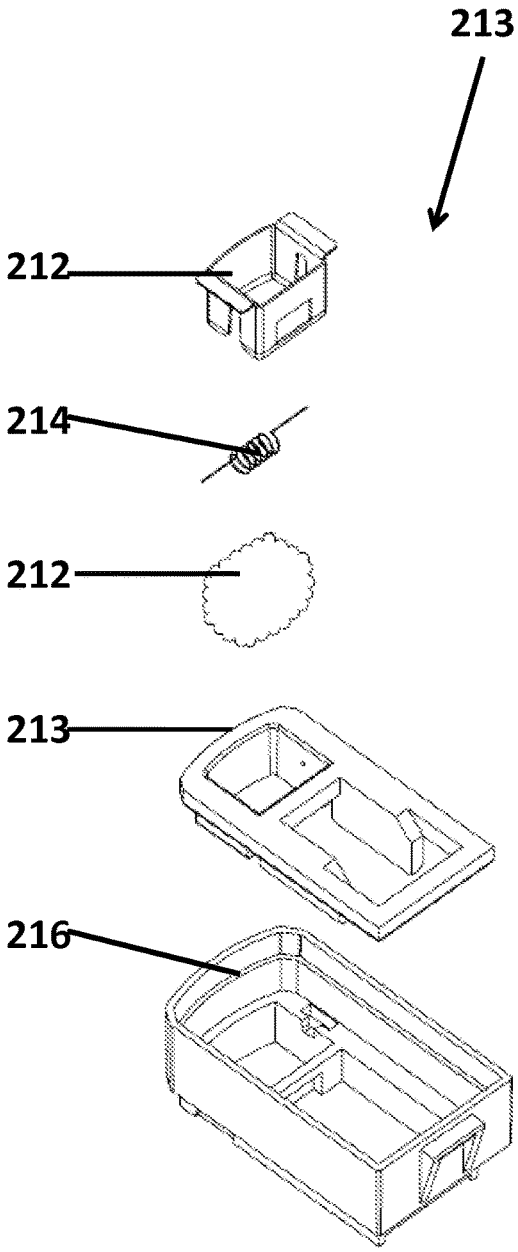

FIGS. 17 and 18A-18B illustrates the assembly of the atomizer unit including the wick element 102 and the coil element 104. As shown in FIG. 15B, the elements form an intergrated component that partially guides the liquid to be vaporized, retains the coil 214 and retains the coil adjacent to the heater element 212.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. An electronic cigarette device, comprising:

a housing having a power source and a tank receptacle;

a removable tank configured to be at least partially received in the tank receptacle, the removable tank comprising:

a first side extending from a top side of the removable tank to a bottom side of the removable tank;

a second side opposite the first side;

an air inlet;

a cavity capable of holding an electronic cigarette liquid and being at least partially received in the tank receptacle;

a mouthpiece that forms an air outlet, the mouthpiece formed on the top side of the removable tank, wherein the mouthpiece extends along the first side and is laterally spaced away from the second side and the cavity;

an atomizer portion located at a lower portion adjacent the bottom side of the removable tank, the atomizer portion having a tank well and a heater element; and a mechanical connection configured to removably attach the removable tank to the tank receptacle when engaged, wherein the tank receptacle is configured to support the bottom side and the second side of the removable tank while exposing at least the mouthpiece, the air inlet and the first side of the removable tank when the removable tank is attached to the tank receptacle.

2. The device of claim 1, wherein the heater element is configured to be connected to the power source in the housing and vaporize the electronic cigarette liquid when the removable tank is attached to the tank receptacle.

3. The device of claim 1, wherein the removable tank is a closed tank.

4. The device of claim 2, wherein the vaporized electronic cigarette liquid is configured to exit the device through the mouthpiece.

5. The device of claim 1, wherein the atomizer portion further comprises a wick element so that the wick element is wetted by the electronic cigarette liquid and the wetted wick element is heated by the heater element to vaporize the electronic cigarette liquid.

6. The device of claim 1, wherein the heater element is a coil.

7. The device of claim 6, wherein the coil is a sub-ohm coil.

8. The device of claim 7, wherein the heater element further comprises a first and second electrode at each side of the coil wherein the first and second electrodes electrically connect the coil to the power source.

9. The device of claim 1, wherein the housing further comprises an attachment mechanism that retains the removable tank in the housing.

10. The device of claim 9, wherein the mechanical connection of the removable tank is configured to mate with the attachment mechanism of the housing.

11. The device of claim 10, wherein the attachment mechanism of the housing is a biased strip and the mechanical connection of the removable tank is one or more shoulders wherein the one or more shoulders interact with the biased strip to retain the removable tank in the housing.

12. The device of claim 1, wherein the removable tank has a sealing mechanism that seals the liquid in the disposable tank when the removable tank is not coupled to the housing.

13. The device of claim 12, wherein the sealing mechanism releases the liquid from the removable tank into a region abutting the heater element when the removable tank is coupled to the housing.

14. The device of claim 1, wherein the power source is a battery.

15. The device of claim 1, wherein the power source further comprises an inductive charging element.

16. The device of claim 1, wherein the removable tank has an airflow mechanism.

17. A method, comprising:

inserting a removable tank into a tank receptacle of a housing configured to receive the removable tank, wherein the removable tank comprises:

a first side extending from a top side of the removable tank to a bottom side of the removable tank;

a second side opposite the first side;

an air inlet;

a cavity holding a liquid and capable of being at least partially received in the tank receptacle;

a mouthpiece that forms an air outlet, the mouthpiece formed on the top side of the removable tank, wherein the mouthpiece extends along the first side and is laterally spaced away from the second side and the cavity; and an atomizer portion located at a lower portion adjacent the bottom side of the removable tank, the atomizer portion having a tank well and a heater element;

wherein the tank receptacle is configured to support the bottom side and the second side of the removable tank while exposing at least the mouthpiece, the air inlet and the first side of the removable tank when the removable tank is inserted to the tank receptacle;

releasing the liquid in the cavity into the atomizer portion when the removable tank is inserted into the housing; and vaporizing, using the heater element in the atomizer portion, the liquid released into the atomizer portion.

18. The method of claim 17, further comprising removing the removable tank from the housing and inserting a new removable tank into the housing.

19. The method of claim 18, wherein removing the removable tank further comprises automatically sealing the disposable tank to prevent leakage of any liquid remaining in the removable tank.

20. The method of claim 17, wherein vaporizing the liquid further comprises wetting a wick element of the atomizer portion using the liquid and heating the wetted wick element using the heater element to vaporize the liquid.

21. The method of claim 17 further comprising retaining, by an attachment mechanism of the housing, the removable tank in the housing and providing power from the housing to the removable tank.

22. The method of claim 21, wherein retaining the removable tank further comprises mating a mechanical connection in the removable tank with the attachment mechanism in the housing to retain the removable tank in the housing.

23. A closed tank apparatus for use with an electronic cigarette, the apparatus comprising:

a removable tank that is configured to hold a liquid to be vaporized by the electronic cigarette, the removable tank comprising:

a first side extending from a top side to the bottom side of the removable tank;

a second side opposite the first side;

an air inlet;

a heater element;

a cavity capable of holding a liquid; and a mouthpiece that forms an air outlet, the mouthpiece formed on the top side of the removable tank, wherein the mouthpiece extends along the first side and is laterally spaced away from the second side and the cavity;

wherein the *tank apparatus is configured so that* air travels through a first path down from the air inlet towards the heater element, and then past the heater element and then through a second path upwards through the air outlet and the mouthpiece, the second path positioned between the cavity and the first side.

24. The apparatus of claim 23, wherein the removable tank is a closed tank.

25. The apparatus of claim 23, wherein the removable tank further comprises a mechanical connection configured to mate mechanism that mates with an attachment mechanism of a housing of the electronic cigarette.

26. The apparatus of claim 25, wherein the mechanical connection is one or more shoulders wherein the one or more shoulders are configured to interact with a biased strip of the housing to retain the removable tank in the housing.

*27. A removable tank apparatus for use with an electronic cigarette, the apparatus comprising:*

*a tank that is configured to hold a liquid to be vaporized by the electronic cigarette, the tank comprising:*

*a first side extending from an upper side to a lower side of the tank;*

*a second side opposite the first side;*

*an air inlet;*

*a heater element;*

*a wick;*

*a cavity having a top surface and a bottom surface, wherein the cavity is capable of holding the liquid; and*

*an atomization chamber sealed to the bottom surface of the cavity, the atomization chamber comprising:*

*a plurality of side walls;*

*an upper surface sealed to the plurality of side walls; and*

*an opening configured to permit wicking of the liquid from the cavity into the atomization chamber;*

*wherein the heater element and the wick are secured within the atomization chamber; and*

*a mouthpiece that forms an air outlet, the mouthpiece located on the upper side of the tank;*

*wherein the tank apparatus is configured so that air travels through a first path from the air inlet towards the heater element, and then past the heater element and through a second path through the air outlet of the mouthpiece.*

*28. The tank apparatus of claim 27, wherein the upper surface of the atomizing chamber comprises flexible silicone.*

*29. The tank apparatus of claim 28, wherein the upper surface has a post positioned to interface with a receptacle in a housing.*

*30. The removable tank apparatus of claim 27, wherein the tank further comprises an inhalation tube coupled to the air outlet and the mouthpiece.*

*31. The removable tank apparatus of claim 27, wherein the plurality of side walls are made of plastic.*

*32. A system for vaporization of a liquid containing nicotine, the system comprising:*

*a removable tank apparatus comprising:*

*a tank that is configured to hold a liquid to be vaporized, the tank comprising:*

*a first side extending from an upper side to a lower side of the tank;*

*a second side opposite the first side;*

*an air inlet;*

*a heater element;*

*a wick;*

*a cavity having a top surface and a bottom surface, wherein the cavity is capable of holding the liquid; and*

*an atomization chamber sealed to the bottom surface of the cavity, the atomization chamber comprising:*

*a plurality of side walls;*

*an upper surface sealed to the plurality of side walls; and*

*an opening configured to permit wicking of the liquid from the cavity into the atomization chamber;*

*wherein the heater element and the wick are secured within the atomization chamber; and*

*a mouthpiece that forms an air outlet, the mouthpiece located on the upper side of the tank; and*

*wherein the tank apparatus is configured so that air travels through a first path from the air inlet towards the heater element, and then past the heater element and through a second path through the air outlet of the mouthpiece; and*

*a housing comprising:*

*a receptacle configured to removably receive the removable tank apparatus; and*

*a battery.*

* * * * *